US012785381B2

(12) United States Patent
Badin et al.

(10) Patent No.: US 12,785,381 B2
(45) Date of Patent: Nov. 3, 2026

(54) DEVICE FOR PROTECTION AGAINST OVERVOLTAGES, AS WELL AS ELECTRICAL INSTALLATION COMPRISING SUCH A PROTECTION DEVICE

(71) Applicant: Schneider Electric Industries SAS, Rueil Malmaison (FR)

(72) Inventors: Didier Badin, Saint Martin d'Hères (FR); Simon Tian, Saint Ismier (FR); Stéphane Vila, Le Pont de Claix (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 122 days.

(21) Appl. No.: 18/918,266

(22) Filed: Oct. 17, 2024

(65) Prior Publication Data

US 2025/0132555 A1 Apr. 24, 2025

(30) Foreign Application Priority Data

Oct. 20, 2023 (FR) ...................................... 2311375

(51) Int. Cl.
*H02H 3/20* (2006.01)
*H02B 1/052* (2006.01)
*H02B 1/18* (2006.01)

(52) U.S. Cl.
CPC ............... *H02H 3/20* (2013.01); *H02B 1/052* (2013.01); *H02B 1/18* (2013.01)

(58) Field of Classification Search
CPC . H02H 3/20; H02B 1/052; H02B 1/18; H01H 85/44; H01H 2037/762; H01T 4/04; H01T 4/06; H01T 1/14; H01C 7/126
See application file for complete search history.

(56) References Cited

U.S. PATENT DOCUMENTS

| | | | | |
|---|---|---|---|---|
| 10,319,545 | B2 * | 6/2019 | Kamensek | H01T 4/08 |
| 10,734,176 | B2 | 8/2020 | Kamensek et al. | |
| 11,990,745 | B2 * | 5/2024 | Polychronakis | H02H 9/041 |
| 2012/0206848 | A1 * | 8/2012 | Gillespie | H01T 4/06 361/104 |
| 2023/0223749 | A1 | 7/2023 | Polychronakis et al. | |
| 2025/0300455 | A1 * | 9/2025 | Harbott | H01T 4/06 |

FOREIGN PATENT DOCUMENTS

| | | | | |
|---|---|---|---|---|
| CN | 104795809 B | * | 3/2019 | H01H 71/082 |
| CN | 110379682 A | | 10/2019 | |

OTHER PUBLICATIONS

French Search Report and Written Opinion dated Apr. 25, 2024 for corresponding French Patent Application No. FR2311375, 7 pages.

* cited by examiner

*Primary Examiner* — Jeffrey A Gblende
*Assistant Examiner* — Nicolas Bellido
(74) *Attorney, Agent, or Firm* — Patterson + Sheridan, LLP

(57) ABSTRACT

A protection device against overvoltages includes a housing and an electrical module arranged in an internal volume of the housing. The electrical module includes a phase terminal, adjacent to one end of the housing, a location, adjacent to an opposite end of the housing, and a fuse and a varistor, connected in series to the phase terminal and distributed along a length axis so that the fuse is arranged between the phase terminal and the varistor and the varistor is arranged between the fuse and the location. The electrical module further includes a gas spark gap and a ground terminal, which are connected in series with the varistor and arranged in the location.

13 Claims, 13 Drawing Sheets

DEVICE FOR PROTECTION AGAINST OVERVOLTAGES, AS WELL AS ELECTRICAL INSTALLATION COMPRISING SUCH A PROTECTION DEVICE

TECHNICAL FIELD

The present invention relates to a protection device against overvoltages. It also relates to an electrical installation comprising such a protection device.

BACKGROUND

An electrical installation in a building usually comprises an electrical switchboard connecting this installation to a collective electricity distribution network and to ground. Generally speaking, the electrical installation also comprises various devices for protecting, controlling and/or monitoring the installation. Among these various devices, protection devices against overvoltages, commonly called surge arresters or surge suppressors or else SPD, the acronym for surge protection devices, are known in particular. These protection devices make it possible to protect the electrical installation against transient overvoltages in the electric current supplied to this installation. These overvoltages typically result from lightning or incidents on the electricity distribution network. Such transient overvoltages are characterized by a significant transient increase in the supply voltage and are often accompanied by strong current pulses.

The invention focuses more specifically on electrical switchboards on an intermediate part of which there are arranged phase busbars, in parallel and side-by-side, typically three thereof, which are intended to be supplied with power respectively by one phase of a multi-phase voltage, typically a three-phase voltage. These busbars, as they are commonly known in the field, thus form a group. Such electrical switchboards are common in many English-speaking countries, in particular in the United Kingdom, where the phase busbars generally extend vertically lengthwise, in the centre of the electrical switchboard. To make it possible to support items of electrical equipment to be connected to the phase busbars, the electrical switchboard is very often provided with two rails, such as DIN rails, which each extend lengthwise parallel to the phase busbars and which are arranged along and on either side of the group formed by the phase busbars. Items of electrical equipment, such as certain protection, control and/or monitoring devices, may then be mounted on the rails, each arranged perpendicular to the group of phase busbars to which these items of equipment are connected directly. This arrangement of the electrical switchboard means that it is often referred to as being of "fishbone" type. Where applicable, the electrical switchboard is supplemented by two neutral busbars, which are intended to be connected to the neutral of the electric current and which extend lengthwise parallel to and at a distance from the phase busbars, one of the two rails being interposed between the group of phase busbars and one of the two neutral busbars, whereas the other rail is interposed between the group of phase busbars and the other neutral busbar.

The protection devices against transient overvoltages that are currently available for electrical switchboards of "fishbone" type are not satisfactory. Indeed, due to the electrical hardware that they incorporate, these protection devices are generally bulky, meaning that they cannot be mounted on any of the rails of the electrical switchboard, and if they are, they occupy a significant segment thereof. This very often leads to at least some of the components of the protection device, or even the entire protection device, being arranged outside the rails, at a distance from the group of phase busbars, where applicable in a dedicated additional housing separate from the electrical switchboard. In any case, this then means having to resort to dedicated wiring between at least part of the protection device and the phase and neutral busbars: beyond the constraints in terms of installation and bulk that this involves, the abovementioned wiring, due to its length, often leads to a drop in the efficiency of the protection device against overvoltages.

SUMMARY

The present invention aims to overcome the problem outlined above by proposing a protection device against overvoltages that, while still being efficient and practical, is particularly suitable for electrical switchboards of the abovementioned "fishbone" type.

To this end, the invention relates to a protection device against overvoltages comprising:

- a housing, which defines a depth axis, a width axis and a length axis that are perpendicular to one another, and which includes:
  - a front and a back, which are opposite one another along the depth axis, the back being designed to cooperate with a rail of an electrical switchboard so that the housing is supported by the rail,
  - two side flanks, which are opposite one another along the width axis and which are connected to one another along the width axis by the front and the back of the housing, and
  - first and second ends, which are opposite one another along the length axis and which are connected to one another along the length axis by the front, the back and the two side flanks of the housing, and
- an electrical module or else a plurality of electrical modules, arranged in an internal volume of the housing, delimited jointly by the front, the back, the two side flanks and the first and second ends of the housing,
- wherein the electrical module or else each of the electrical modules of said plurality comprises:
- a phase terminal, which is adjacent to the first end of the housing such that a phase conductor of the electrical switchboard is able to be connected to the phase terminal at the first end of the housing,
- a location, which is adjacent to the second end of the housing, and
- a fuse and a varistor, which are connected in series to the phase terminal in the internal volume of the housing and which, along the length axis, are distributed such that the fuse is arranged between the phase terminal and the varistor and that the varistor is arranged between the fuse and the location,
- and wherein the electrical module or else one of the electrical modules of said plurality furthermore comprises a gas spark gap and a ground terminal, which are:
  - connected in series to the varistor of the electrical module or else to the respective varistors of the electrical modules of said plurality in the internal volume of the housing, and
  - arranged in the location of the electrical module in question such that a protective conductor of the electrical switchboard is able to be connected to the ground terminal at the second end of the housing.

One of the ideas on which the invention is based is that of making the protection device both compact and modular, notably for the purposes of adapting it to an electrical switchboard of the abovementioned "fishbone" type. To this end, the invention makes provision to arrange, in the form of an electrical module, components that are arranged in succession along a length axis of the housing of the protection device, these components being a phase terminal, a fuse and a varistor, which are connected in series inside the housing. The invention also makes provision for each electrical module to include a location that, along the length axis, is opposite the phase terminal, the varistor thus being arranged between this location and the fuse: a gas spark gap and a ground terminal are received in the location of the electrical module when the protection device comprises only a single electrical module of this type or else are received in just one of the respective locations of the electrical modules when the protection device comprises a plurality of such electrical modules, the gas spark gap and the ground terminal being connected in series to the one or more varistors. The protection device according to the invention may thus advantageously be developed as a single-phase version with a single electrical module and a three-phase version with three electrical modules. The modular design allows the protection device according to the invention both to optimize manufacture thereof in industry, by easily and inexpensively adapting the protection device to the number of phases that the protection device is to protect, and to facilitate maintenance or repair interventions on the protection device.

Moreover, the fact that the fuse, the varistor and the gas spark gap are "stacked" along the length axis between the phase terminal and the ground terminal takes maximum advantage, in terms of arrangement, of the dimension of the housing along this length axis, thereby making it possible to minimize the dimension of the housing along a width axis of the housing as far as possible. This dimension of the housing along the width axis may thus advantageously reach a value of 18 mm when the protection device according to the invention comprises only a single electrical module and a value of 54 mm when the protection device according to the invention comprises three electrical modules, it being noted that these values of 18 mm and 54 mm are standard market sizes.

In any case, the phase terminal and the ground terminal are located, within the protection device according to the invention, respectively at the two ends of the housing that are opposite along the length axis, thereby making it possible to mount the housing on a rail of an electrical switchboard of the abovementioned "fishbone" type, such that the phase terminal faces the group of phase busbars in order to be connected easily and directly to one thereof. In other words, the protection device according to the invention is particularly suitable for electrical switchboards of the abovementioned "fishbone" type. As detailed below, the protection device according to the invention is advantageously suitable for electrical switchboards of "fishbone" type, including neutral busbars: to this end, the protection device then incorporates a neutral terminal, which is adjacent to the same end of the housing as that to which the ground terminal is adjacent, and which is connected to the ground terminal via the gas spark gap.

Other advantageous aspects of the device according to the invention, which are aimed in particular at improving the performance thereof, will also be detailed below.

Thus, according to some advantageous additional features of the protection device according to the invention, taken on their own or in any technically possible combination:

- the electrical module or else one of the electrical modules of said plurality furthermore comprises a neutral terminal that is (i) connected to the ground terminal via the gas spark gap in the internal volume of the housing, and (ii) adjacent to the second end of the housing such that a neutral conductor of the electrical switchboard is able to be connected to the neutral terminal at the second end of the housing;
- the gas spark gap is connected to the varistor of the electrical module or else to the respective varistors of the electrical modules of said plurality by a conductive plate (i) that is arranged in the internal volume of the housing, while being adjacent to the back of the housing, and (ii) against which a terminal of the gas spark gap is applied along the depth axis;
- the neutral terminal is connected to the gas spark gap by the conductive plate;
- provision is made for a single electrical module, the protection device being single-phase, and the two side flanks of the housing are planar and parallel and spaced from one another by 18 mm along the width axis;
- provision is made for three electrical modules, the protection device being three-phase, and the two side flanks of the housing are planar and parallel and spaced from one another by 54 mm along the width axis;
- for the electrical module or else each of the electrical modules of said plurality, the fuse has an elongate shape that extends lengthwise from substantially the front to substantially the back of the housing;
- for the electrical module or else each of the electrical modules of said plurality, the fuse and the varistor are connected to one another by an electrical link including two contacts and a weld that joins the two contacts when the weld is intact while at the same time being designed to break under the effect of heating of the varistor, and one of the two contacts is carried by an arm, which is held fixed in position by the weld when the weld is intact, and which is driven by a spring in the internal volume of the housing when the weld is broken so as to space the two contacts from one another at least along the width axis;
- the protection device furthermore comprises an electronic supervision device that (i) includes an assembled printed circuit that is configured to provide an end-of-life indication for the electrical module or else for the electrical modules of said plurality, and (ii) is arranged in the internal volume of the housing such that the assembled printed circuit is adjacent to one of the side flanks of the housing;
- the electronic supervision device is connected to the respective varistors of the electrical modules of said plurality by respective conductive wires, and the housing includes internal partitions that position the conductive wires in the internal volume of the housing and keep them spaced from one another.

The invention also relates to an electrical installation comprising:

- an electrical switchboard that comprises (i) phase busbars, which are intended to be supplied with power respectively by a phase of a voltage of an electric power supply and which extend lengthwise parallel to one another, while being arranged side-by-side so as to form a group in an intermediate zone of the electrical switchboard, (ii) two rails, which are each designed to support items of electrical equipment and which each extend lengthwise parallel to the phase busbars, the two rails being arranged along and on either side of the group, and (iii) a ground strip that is intended to be connected to ground, and the protection device as defined above, wherein the housing is mounted on one of the two rails such that the first end of the housing faces the group of phase busbars along the length axis, wherein the phase terminal of the electrical module or of each of the electrical modules of said plurality is connected to one of the phase busbars by a phase conductor, which extends from and transverse to the phase busbar in question and which is connected to the phase terminal of the electrical module in question at the first end of the housing, and wherein the ground terminal is connected to the ground strip by a protective conductor, which is in wired form and one end of which is connected to the ground terminal at the second end of the housing.

According to some advantageous additional features of the electrical installation according to the invention:

a neutral conductor is connected to the neutral terminal at the second end of the housing;

the electrical switchboard furthermore comprises, for at least one of the two rails, a neutral busbar that is intended to be supplied with power by a neutral of the electric power supply and that extends lengthwise parallel to and at a distance from the phase busbars, said at least one of the two rails being interposed between the neutral busbar and the group of phase busbars, and the neutral terminal is connected to the neutral busbar by the neutral conductor that extends from and transverse to the neutral busbar.

BRIEF DESCRIPTION OF THE DRAWINGS

The invention will be understood better upon reading the following description, which is given solely by way of example and with reference to the drawings, in which.

DETAILED DESCRIPTION

Figure 1:
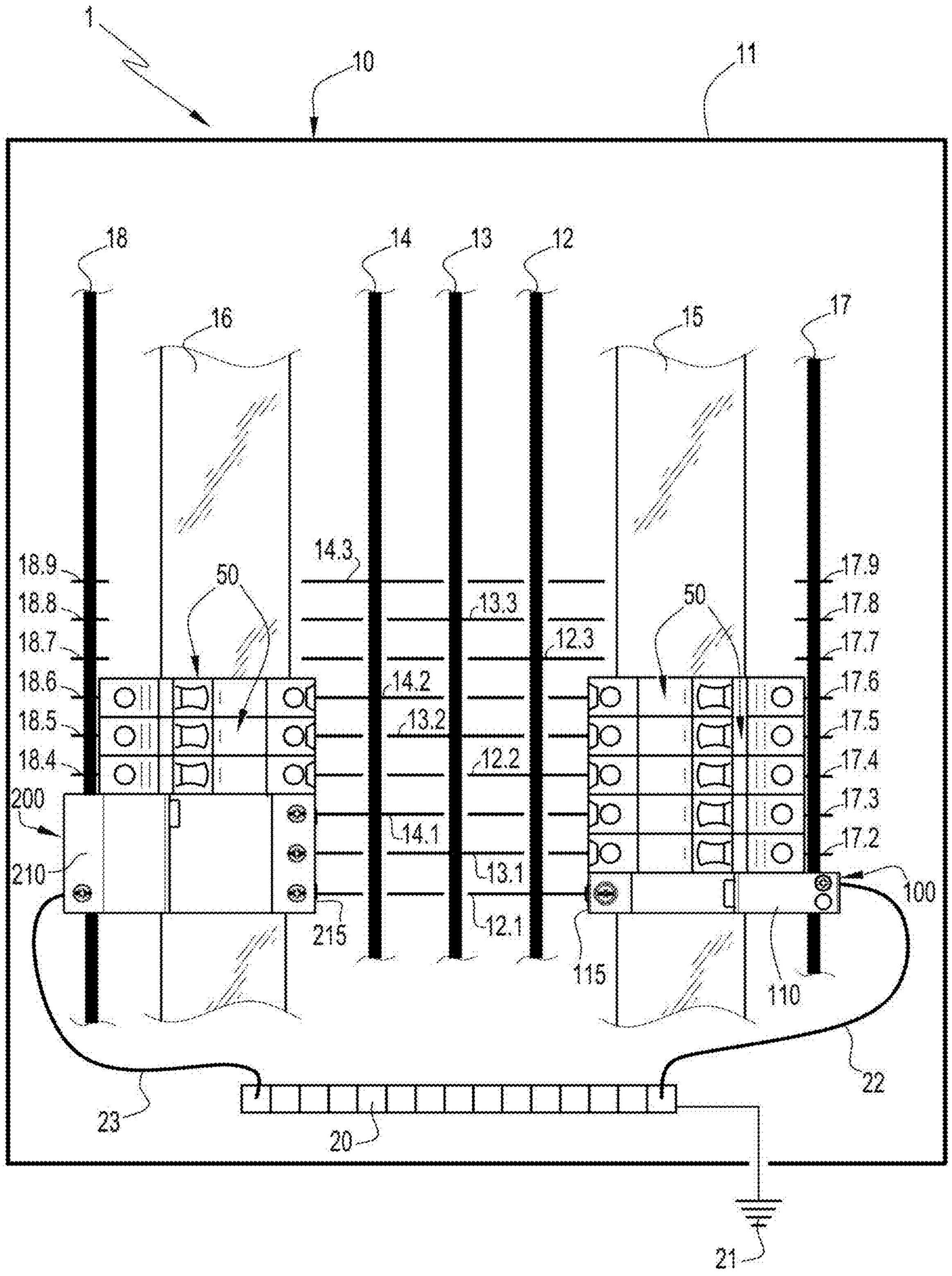
FIG. 1 is a schematic plan view of an electrical installation according to the invention.

FIG. 1 shows an electrical installation 1 fitted for example in a building for the purposes of connecting said building to a collective electricity distribution network.

The electrical installation 1 comprises an electrical switchboard 10, which allows the electrical installation 1 to be connected to the electricity distribution network and which is installed fixedly in the building.

As illustrated schematically in FIG. 1, the electrical switchboard 10 comprises an insulating backbone 11, which is fixed to the building and which supports the other components of the electrical switchboard 10, in particular the electrical components thereof, while electrically insulating them from the building. The implementation form of the backbone 11 is not limiting.

The electrical switchboard 10 also comprises phase busbars, three thereof here, which are respectively referenced 12, 13 and 14. The phase busbars 12, 13 and 14, as they are known in the field, during service, are respectively supplied with power by one phase of a voltage of an electric power supply, a three-phase one here, provided by the abovementioned electricity network. To this end, the phase busbars 12, 13 and 14 are connected to a power supply cable of the electricity network, in non-limiting layouts that are not visible in FIG. 1. Each of the phase busbars 12, 13 and 14 primarily comprises a conductive bar or else a set of conductive bars that are aligned and joined to one another. In any case, the phase busbars 12, 13 and 14 extend lengthwise parallel to one another, arranged side-by-side while at the same time obviously being electrically insulated from one another. The phase busbars 12, 13 and 14 thus form a group that is arranged in an intermediate zone, or central zone, of the electrical switchboard 10, while being located in an intermediate region, or central region, of the backbone 11. In practice, as illustrated schematically in FIG. 1, the phase busbars 12, 13 and 14 thus extend lengthwise along the vertical, and the group formed thereby is located horizontally midway between the left and right side end edges of the frame 11.

As illustrated only schematically in FIG. 1, the phase busbar 12 is provided with phase conductors 12.1, 12.2, 12.3 that extend from and transverse to the phase busbar 12, both on either side thereof and distributed regularly along it. These phase conductors 12.1, 12.2, 12.3 are for example fins that form, integrally with the phase busbar 12, an electrical comb the teeth of which correspond to the abovementioned fins and that distributes the phase supplied to this phase busbar 12. Of course, the number of phase conductors 12.1, 12.2, 12.3 of the phase busbar 12, which is equal to three in the example of FIG. 1, is not limiting.

The phase busbar 13 is provided with phase conductors 13.1, 13.2 and 13.3, which are functionally and structurally similar to the phase conductors 12.1, 12.2 and 12.3 of the phase busbar 12, but for the phase busbar 13. Likewise, the phase busbar 14 is provided with phase conductors 14.1, 14.2 and 14.3, which are functionally and structurally similar to the phase conductors 12.1, 12.2 and 12.3 of the phase busbar 12, but for the phase busbar 14. Of course, the various phase conductors 12.1, 12.2 and 12.3, 13.1, 13.2 and 13.3, 14.1, 14.2 and 14.3 are electrically insulated from one another, and also from the two phase busbars with which they are not associated, while at the same time being distributed alternately with one another, such that, along the longitudinal direction of the phase busbars 12, 13 and 14, the sequence is the phase conductor 12.1, the phase conductor

13.1, the phase conductor 14.1, the phase conductor 12.2, the phase conductor 13.2, the phase conductor 14.2 and so on.

The electrical switchboard 10 also comprises two rails 15 and 16 that are each designed to support items of electrical equipment. The rails 15 and 16 are for example DIN rails, which are well known as such in the field. As illustrated schematically in FIG. 1, each of the rails 15 and 16 extends lengthwise parallel to the phase busbars 12, 13 and 14. The rails 15 and 16 are arranged along and on either side of the group formed by the phase busbars 12, 13 and 14.

In practice, the specific features intrinsic to the rails 15 and 16 are not limiting provided that the rails 15 and 16 advantageously allow the electrical switchboard 10 to be made modular in the sense that each of the rails 15 and 16 is designed to indifferently support various items of electrical equipment to be connected to the phase busbars 12, 13 and 14, it being noted that such items of electrical equipment are illustrated in FIG. 1, as detailed below: these various items of electrical equipment, which advantageously makes it possible to protect, control and/or supervise the electrical installation 1, are chosen according to the requirements of the electrical installation 1 and are interchangeable in the event of maintenance or the abovementioned requirements changing. In any case, the items of electrical equipment that are actually mounted on the rails 15 and 16 are arranged perpendicular to these rails 15 and 16 and to the group formed by the phase busbars 12, 13 and 14 to which these items of electrical equipment are able to be connected directly via the phase conductors 12.1 to 14.3. The electrical switchboard 10 is thus of "fishbone" type, as explained in the introduction of this document.

As may be seen clearly in FIG. 1, the items of electrical equipment, mounted on the rails 15 and 16, include two protection devices against overvoltages, namely a single-phase protection device 100, which is mounted here on the rail 15 and which is shown on its own in FIGS. 2 to 6, and a three-phase protection device 200, which is mounted here on the rail 16 and which is shown on its own in FIGS. 7 to 11. As illustrated schematically in FIGS. 1 and 2, the protection device 100 is connected to the phase busbar 12 by the phase conductor 12.1, it being noted that this protection device 100 is not connected to the other phase busbars 13 and 14. As illustrated schematically in FIGS. 1 and 7, the protection device 200 is connected to the phase busbars 12, 13 and 14 by the phase conductors 12.1, 13.1 and 14.1, respectively. The protection devices 100 and 200 will be described in more detail below.

It should be noted that, in practice, an electrical installation of the type of the installation 1 comprises only one or the other of the protection devices 100 and 200. However, in FIG. 1, the protection devices 100 and 200 are both shown together in one and the same electrical switchboard, i.e. the switchboard 10, to illustrate how these protection devices 100 and 200 are arranged in such an electrical switchboard.

Moreover, in the example illustrated in FIG. 1, the items of electrical equipment, mounted on the rails 15 and 16, also include lever-based circuit breakers 50. Each of these lever-based circuit breakers 50 is connected to one of the phase busbars 12, 13 and 14 via one of the phase conductors 12.1 to 14.3 that belongs to the phase busbar in question. In one variant that is not shown, the electrical installation 1 comprises multiple other items of electrical equipment, in addition to and/or as a substitute for the lever-based circuit breakers 50, depending on the requirements of the electrical installation 1.

Returning to the description of the electrical switchboard 10 of FIG. 1, the latter advantageously here comprises two neutral busbars 17 and 18. During service, the neutral busbars 17 and 18 are supplied with power by a neutral of the electric power supply and are for this purpose connected to the abovementioned power supply cable in layouts that are not limiting and not visible in FIG. 1. Each of the neutral busbars 17 and 18 extends lengthwise parallel to and at a distance from the phase busbars 12, 13 and 14, the rail 15 being interposed between the neutral busbar 17 and the group formed by the phase busbars 12, 13 and 14, whereas the rail 16 is interposed between the neutral busbar 18 and this group.

The neutral busbar 17 is provided with neutral conductors 17.1 to 17.9 that extend from and transverse to the neutral busbar 17, while being distributed regularly along this neutral busbar 17. These neutral conductors are for example fins that form, integrally with the neutral busbar 17, an electrical comb the teeth of which correspond to the abovementioned fins and that distributes the neutral supplying power to the neutral busbar 17. Of course, the number of these neutral conductors 17.1 to 17.9 of the neutral busbar 17, which is equal to nine here, is not limiting. Within the electrical installation 1 envisaged here, the neutral conductor 17.1 connects the neutral busbar 17 and the protection device 100 to one another, as illustrated schematically only in FIG. 2, the neutral conductor 17.1 not being visible in FIG. 1.

The neutral busbar 18 is provided with neutral conductors 18.1 to 18.9 that are functionally and structurally similar to the neutral conductors 17.1 to 17.9 of the neutral busbar 17, but for the neutral busbar 18. Within the electrical installation 1, the neutral conductor 18.2 connects the neutral busbar 18 and the protection device 200 to one another, as shown schematically only in FIG. 7, which also illustrates the neutral conductors 18.1 and 18.3, it being noted that these are not visible in FIG. 1.

The electrical switchboard 10 also comprises a ground strip 20 that, during service, is connected directly to the ground of the building, as illustrated schematically in FIG. 1, in which the ground of the building is referenced 21. The layouts in relation to the connection between the ground strip 20 and ground 21 are not limiting. Likewise, the specific features intrinsic to the ground strip 20 and the arrangement thereof with respect to the rest of the electrical switchboard 10 are not limiting, as long as the ground strip 20 is able to be connected, within the electrical installation 1, to the protection devices 100 and 200. Thus, as illustrated schematically in FIGS. 1 and 3, the protection device 100 is connected to the ground strip 20 by a wired protective conductor 22, which may also be called "grounding wire". In addition, as illustrated schematically in FIGS. 1 and 8, the protection device 200 is connected to the ground strip 20 by a wired protective conductor 23, which may also be called "grounding wire".

We will now focus in more detail on the protection devices 100 and 200. Each of these protection devices 100 and 200 makes it possible to protect the electrical installation 1 against transient overvoltages in the electric current supplied to this installation, these transient overvoltages possibly resulting from lightning or incidents on the electricity distribution network. These transient overvoltages are characterized by a significant transient increase in the voltage and are often accompanied by strong current pulses.

The protection device 100 will first be described in detail with reference to FIGS. 2 to 6.

Figure 2:
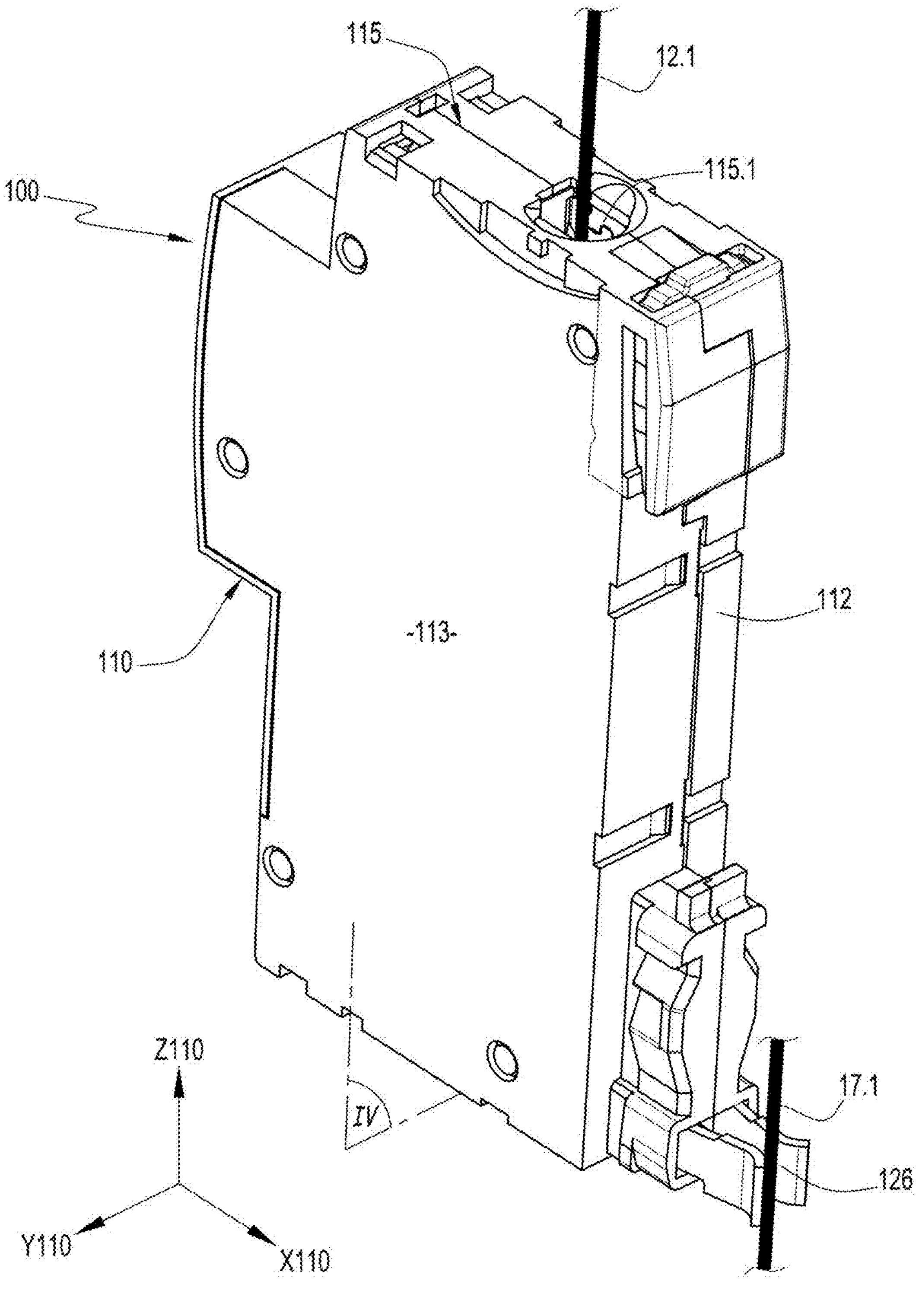
FIG. 2 is a perspective view of a protection device according to the invention, according to a single-phase embodiment.
Figure 3:
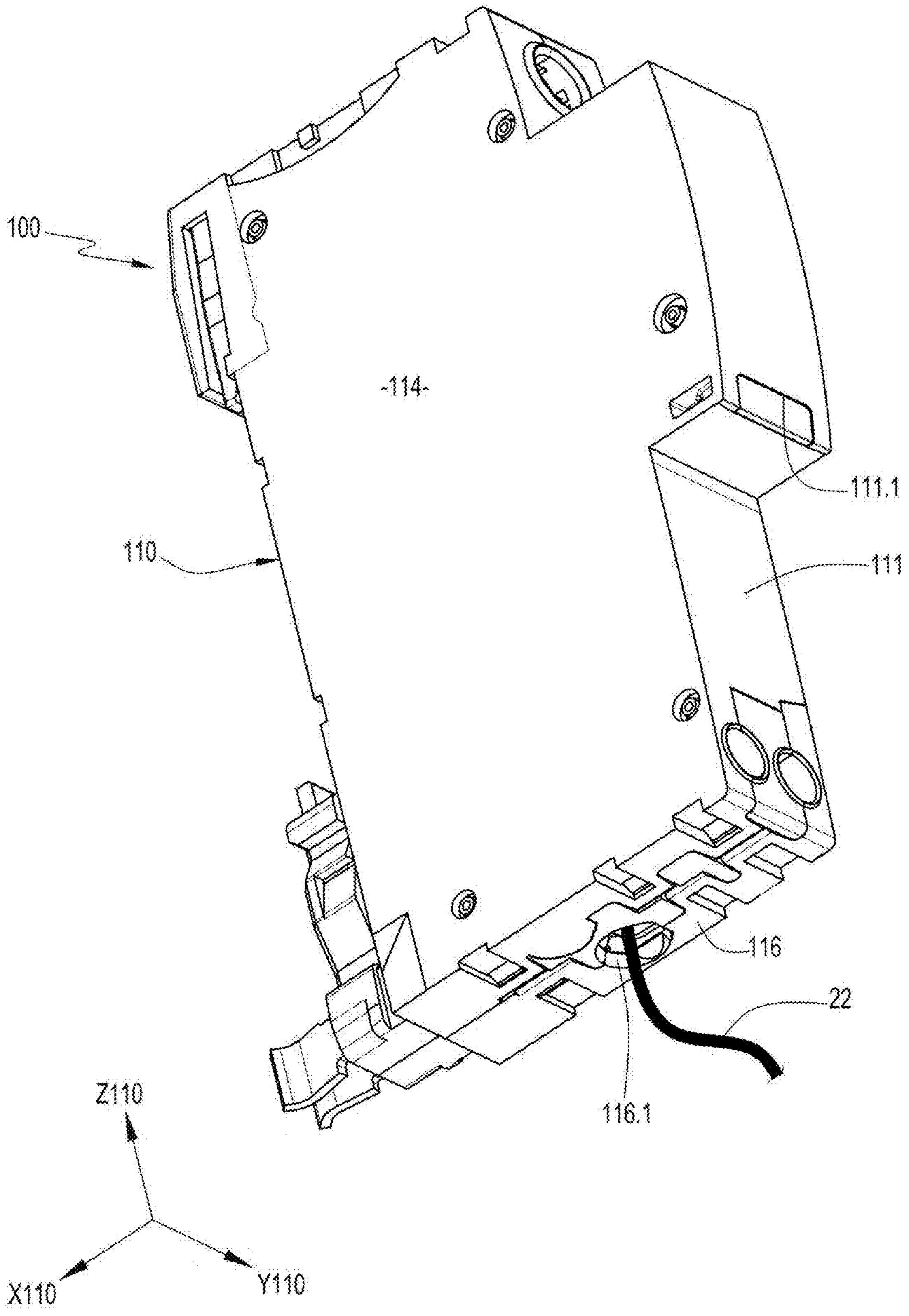
FIG. 3 is a view similar to FIG. 2, at a different observation angle.
Figure 4:
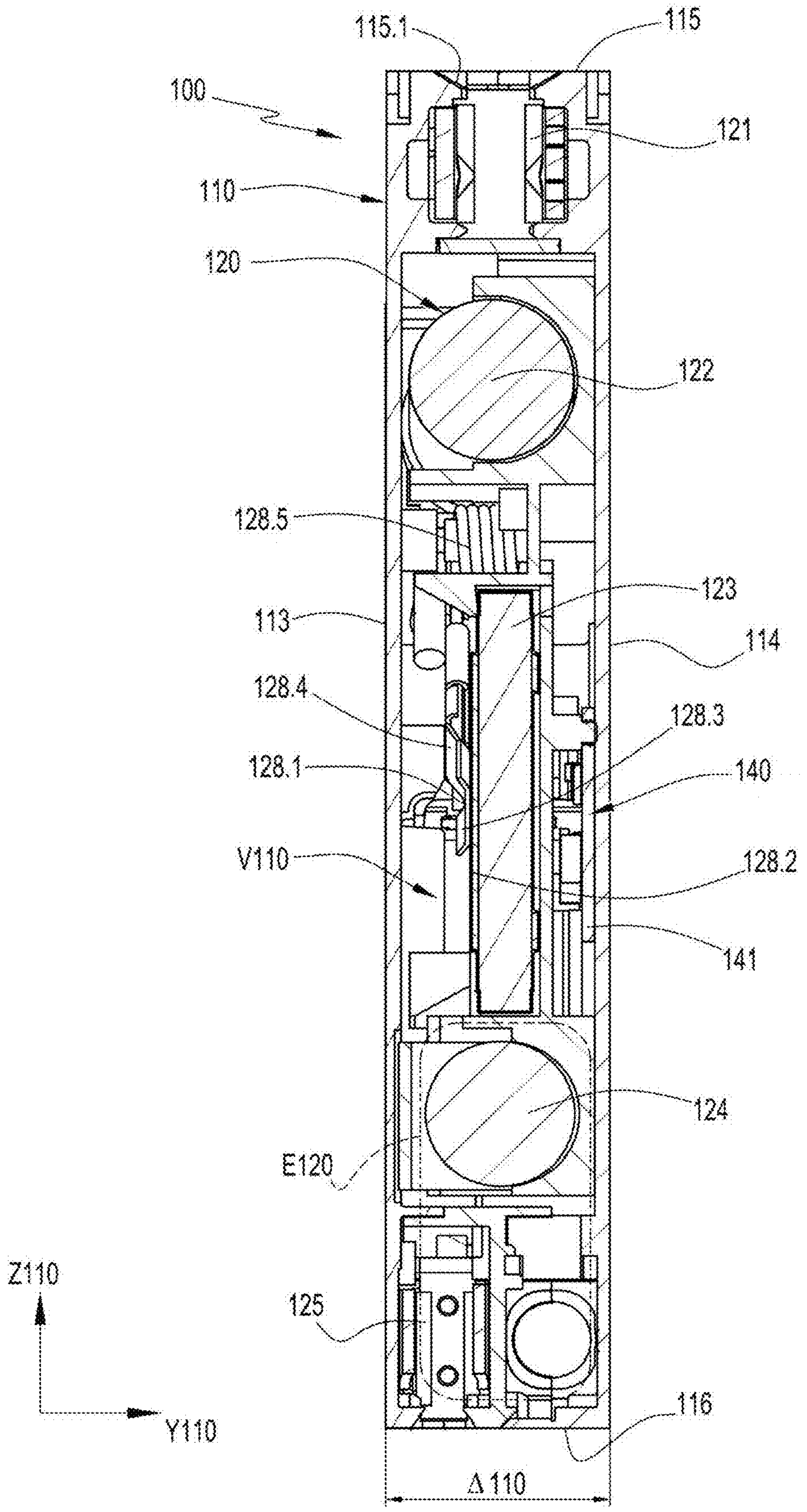
FIG. 4 is a section along the plane IV of FIG. 2.

As may be seen clearly in FIGS. 2 to 4, the protection device 100 comprises a housing 110 that defines a depth axis X110, a width axis Y110 and a length axis Z110, which are perpendicular to one another. The depth axis X110, width axis Y110 and length axis Z110 are thus fixed with respect to the housing 110. In the state in which the protection device 100 is mounted on the rail 15 within the electrical installation 1, the width axis Y110 is parallel to the longitudinal direction of the rail 15 and, therefore, to the longitudinal direction of the phase busbars 12, 13 and 14 and of the neutral busbar 17. In the example in question here, the width axis Y110 thus extends vertically.

The housing 110 constitutes an envelope that is essentially closed and electrically insulating. To this end, the housing 110 includes:

- a front 111 and a back 112, which are opposite one another along the depth axis X110,
- two side flanks 113 and 114, which are opposite one another along the width axis Y110 and which are connected to one another along this width axis Y110 by the front 111 and the back 112, and
- a first end 115 and a second end 116, which are opposite one another along the length axis Z110 and which are connected to one another along this length axis Z110 by the front 111, the back 112 and the side flanks 113 and 114.

The front 111, the back 112, the side flanks 113 and 114 and the first and second ends 115 and 116 together delimit with one another an internal volume V110 of the housing 110, as may be seen clearly in FIG. 3. The internal volume V110 is thus separated from the outside of the housing 110 by the front 111 and the back 112 along the depth axis X110, by the side flanks 113 and 114 along the width axis Y110, and by the first and second ends 115 and 116 along the length axis Z110.

As may be seen clearly in FIG. 3, the front 111 is advantageously provided with a through-window 111.1 that connects the internal volume V110 to the outside of the housing 110. The benefit of this through-window 111.1 will be seen later on.

As may be seen clearly in FIG. 2, the back 112 is designed to cooperate with the rail 15 so that the housing 110 is supported by this rail. To this end, the back 112 incorporates, in particular on its face facing the outside of the housing 110, any appropriate fixing means by way of which the housing 110 is able to be attached fixedly to the rail 15. The implementation form of this fixing means is not limiting, and the fixing provided thereby is for example achieved by form-fitting and/or by jamming and/or by pinching and/or by snap-fitting and/or etc. In any case, in the state in which the protection device 100 is mounted on the rail 15, the first end 116 of the housing 110 faces the group of phase busbars 12, 13 and 14 along the length axis Z110.

As may be seen clearly in FIGS. 1 to 4, the side flanks 113 and 114 are advantageously planar and parallel to one another, each of these side flanks 113 and 114 thus extending here perpendicular to the width axis Y110. The protection device 100, in the state mounted on the rail 15, may thereby be coupled by an item of electrical equipment with planar side flanks, mounted on the rail 15 and arranged directly against one or the other of the side flanks 113 and 115 along the width axis Y110: in the example illustrated in FIG. 1, one of the lever-based circuit breakers 50 mounted on the rail 15 is thus coupled to the housing 110, while having a side flank arranged adjacently against the side flank 113 of the housing 110 along the width axis Y110. In addition, the side flanks 113 and 114 are spaced from one another by a distance, which is denoted Δ110 in FIG. 4 and which is preferably 18 mm. The benefit of this sizing is linked to the fact that this value of 18 mm is a standard market size that is also encountered here for lever-based circuit breakers 50 whose width is 18 mm. It will thus be understood that the space taken up by the housing 110 on the rail 15 along the width axis Y110 is identical to that which may be taken up by another item of electrical equipment able to be mounted on the rail 15, such as lever-based circuit breakers 50, thereby ensuring noteworthy modularity for the electrical installation 1.

As may be seen clearly in FIGS. 2 and 4, the first end 115 of the housing 110 is passed through, here along the axis Z110, by a branching passage 115.1 that connects the internal volume V110 to the outside of the housing 110. During service, the branching passage 115.1 makes it possible to extend the phase conductor 12.1 between the inside and the outside of the housing 110 via this branching passage 115.1, as illustrated schematically in FIGS. 1 and 2.

As may be seen clearly in FIGS. 3 and 4, the second end 116 of the housing 110 is passed through, here along the length axis Z110, by a branching passage 116.1 that connects the internal volume V110 to the outside of the housing 110. During service, this branching passage 116.1 makes it possible to extend one of the ends of the protective conductor 22 between the inside and the outside of the housing 110 via this branching passage 116.1, as illustrated schematically in FIGS. 1 and 3.

In practice, the housing 110 consists of multiple insulating parts that are joined fixedly to one another by any appropriate means that are integrated into the housing 110, it being noted that the corresponding specific features are not limiting.

Figure 5:
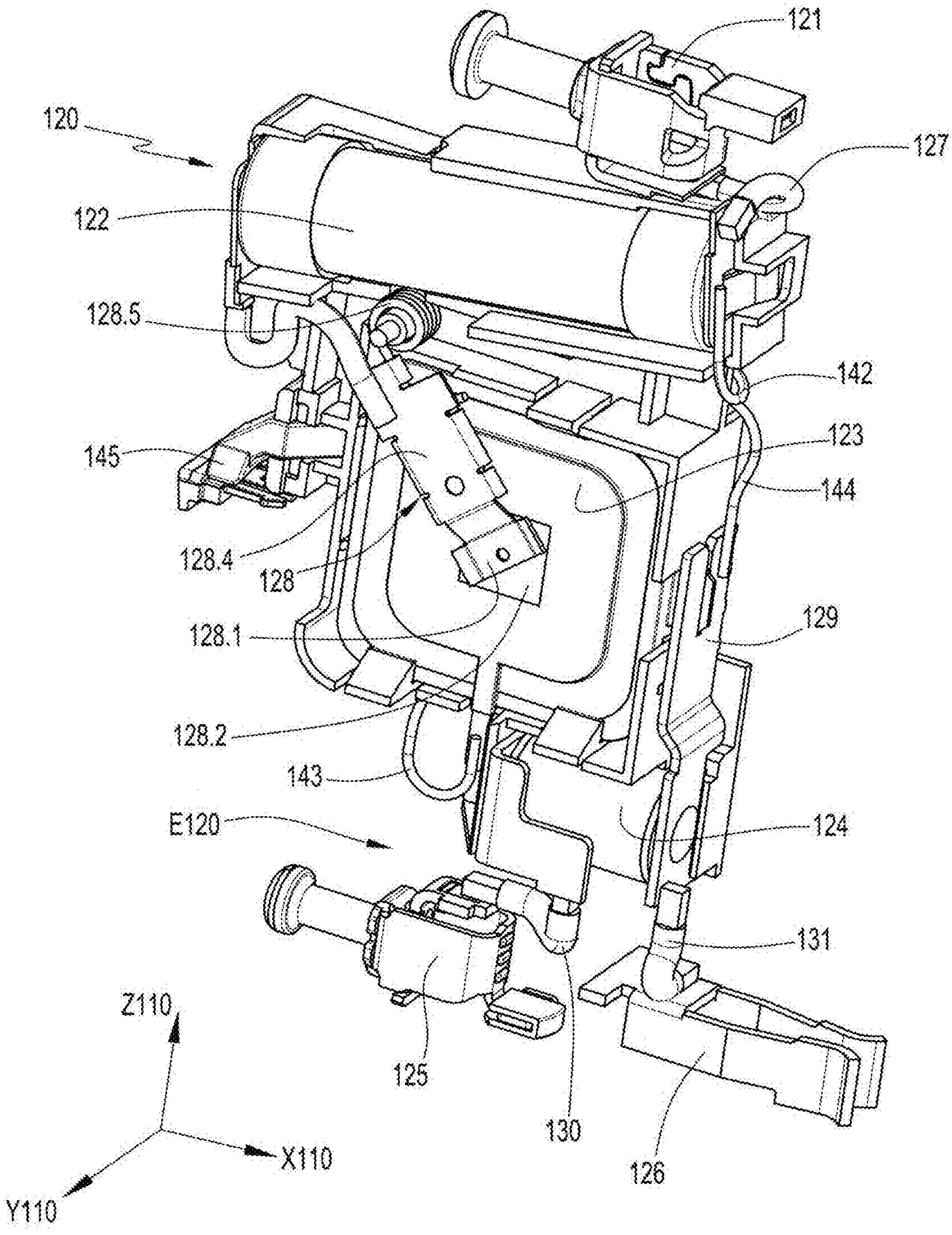
FIG. 5 is a perspective view of some internal components of the protection device of FIG. 2.
Figure 6:
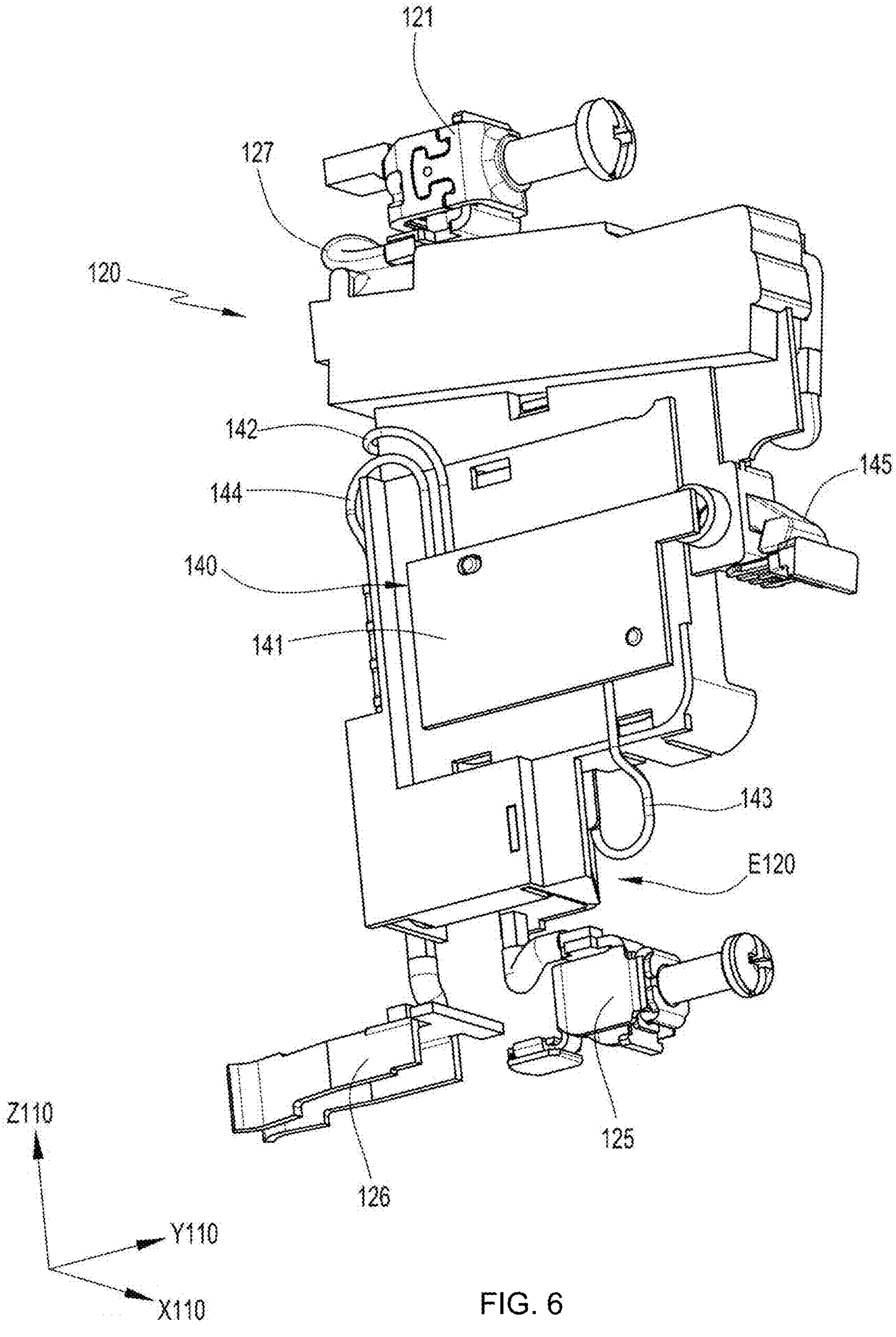
FIG. 6 is a view similar to FIG. 5, at a different observation angle.

The protection device 100 also comprises an electrical module 120. As shown in FIG. 4, the electrical module 120 is arranged in the internal volume V110 of the housing 110. In FIGS. 5 and 6, the electrical module 120 is shown in the absence of the housing 110.

The electrical module 120 performs a dual function, namely a short-circuiting function and a voltage-limiting function. The electrical module 120, when the protection device 100 is connected to the phase conductor 12.1, thus allows the neutral conductor 17.1 and the protective conductor 22 both (i) to stop the flow of an electric current originating from the phase conductor 12.1 therethrough when the strength of the current exceeds a predetermined value and (ii) to easily evacuate a current flowing therethrough in the event of an overvoltage, that is to say when a voltage across its terminals exceeds a predetermined threshold, while still allowing an almost zero leakage current to flow in the absence of such an overvoltage. In practice, the abovementioned dual function is achieved sequentially in the sense that, generally speaking, the short-circuiting function is implemented after the voltage-limiting function.

To this end, as may be seen clearly in FIGS. 4 to 6, the electrical module 120 comprises a phase terminal 121, a fuse 122, a varistor 123, a gas spark gap 124, a ground terminal 125 and a neutral terminal 126, which will be described successively in more detail below.

The phase terminal 121 is designed to be connected to a phase conductor, such as the phase conductor 12.1 within the electrical installation 1. Thus, in the state in which the protection device 100 is mounted on the rail 15, the phase conductor 12.1 is connected to the electrical module 120 and, therefore, to the protection device 100 via the phase terminal 121. In the example in question in the figures, the phase terminal 121 is a screwed terminal but, as a variant that is not shown, it is a sprung terminal. More generally, the specific features of this phase terminal 121 are not limiting, as explained again below.

In any case, as may be seen clearly in FIG. 4, the phase terminal 121 is arranged adjacent to the first end 115 of the housing 110 so that a phase conductor is able to be connected to the phase terminal 121 at this first end 115 of the housing 110. Thus, here, the phase terminal 121 is arranged essentially in the internal volume V110, by being arranged against the wall of the first end 115 of the housing 110, which is passed through by the branching passage 115.1, the phase terminal 121 being aligned with this branching passage 115.1: in this way, when the phase conductor 12.1 extends through the branching passage 115.1, here along the length axis Z110, this phase conductor is received in the phase terminal 121 for the purposes of the electrical connection between this phase conductor and the phase terminal, here by way of the clamping of a screw of the phase terminal 121.

The fuse 122, within the electrical module 120, provides the abovementioned short-circuiting function. In practice, the specific electrical features intrinsic to the fuse 122 are not limiting, the fuse 122 stemming from technologies that are known per se in the field. By way of non-limiting example, the fuse 122 is designed to withstand 8/20 μs waves, as defined for example in the surge arrester standard IEC 61643.

In any case, the fuse 122 is connected in series to the phase terminal 121 in the internal volume V110, here by a conductive braid 127 that is arranged completely in the internal volume V110, connecting the phase terminal 121 and an input terminal of the fuse 122 to one another.

In addition, the fuse 122, which is advantageously arranged completely in the internal volume V110, is arranged, along the length axis Z110, between the phase terminal 121 and the rest of the electrical module 120. The phase terminal 121 and the fuse 122 are thus stacked along the length axis Z110.

According to one preferred aspect that is implemented in the example illustrated in the figures, the fuse 122 has an elongate shape that extends lengthwise from substantially the front 111 to substantially the back 112 of the housing 110. More precisely, here, the fuse 122 has a cylindrical overall shape, which is centred on a geometric axis passing through the front 111 and the back 112 of the housing 110, and the opposite longitudinal ends of which are adjacent to the front 111 and to the back 112, respectively. Regardless of the specific geometric features of the elongate shape of the fuse 122, this arrangement thereof makes it possible to optimize the amount of the internal volume V110 taken up by the fuse 122.

The varistor 123 partially provides the abovementioned voltage-limiting function. Indeed, the varistor 123 is designed to have a low impedance when the voltage across its terminals exceeds a predetermined threshold, thus making it possible to evacuate current therethrough in the event of an overvoltage, whereas, when the voltage across its terminals is below the abovementioned predetermined threshold, in other words in the absence of an overvoltage, the impedance of the varistor 123 is high so as to limit a leakage current therethrough, or even make said leakage current almost zero. In practice, the specific electrical features intrinsic to the varistor 123 are not limiting and stem from technologies that are known per se in the field. By way of non-limiting example, the varistor 123 makes it possible to withstand an 8/20 μs, 20 kA shock wave, while at the same time limiting the voltage across its terminals to a level below 1.5 kV. According to another example, the shock wave to be withstood is 10/350 μs, while at the same time withstanding a current of 12.5 kA and while limiting the voltage across its terminals to 1.5 kV.

In any case, the varistor 123 is connected in series to the fuse 122 in the internal volume V110, here by an electrical link 128 that is arranged completely in the internal volume V110, connecting an output terminal of the fuse 122 and an input terminal of the varistor 123 to one another. The fuse 122 and the varistor 123 are thus connected in series to the phase terminal 121 in the internal volume 110.

In addition, the varistor 123, which is advantageously arranged completely in the internal volume V110, is arranged, along the length axis Z110, between the fuse 122 and the phase terminal 121, on the one hand, and the rest of the electrical module 120, on the other hand. Thus, along the length axis Z110, the phase terminal 121, the fuse 122 and the varistor 123 are distributed such that the fuse 122 is arranged between the phase terminal 121 and the varistor 123. In other words, the phase terminal 121, the fuse 122 and the varistor 123 are stacked along the length axis Z110.

According to one preferred aspect, which is implemented here, the electrical link 128 includes, as may be seen clearly in FIGS. 4 and 5, two contacts 128.1 and 128.2, and a weld 128.3 that joins the contacts 128.1 and 128.2 when the weld 128.3 is intact while at the same time being designed to break under the effect of heating of the varistor 123. The contacts 128.1 and 128.2 and the weld 128.3 thus together form a thermal disconnector that, as long as the varistor 123 is working and is not heating up, keeps the varistor 123 connected to the fuse 122 via the electrical link 128 but that, when the varistor 123 heats up too much, in particular due to ageing thereof, severs the electrical link 128 and therefore renders the electrical module 120 inoperative. In order that the contacts 128.1 and 128.2 are moved apart cleanly from one another when the weld 128.3 is broken, one of the two contacts, here the contact 128.1, is carried fixedly by an arm 128.4 of the electrical link 128: this arm 128.4 is kept fixed in position by the weld 128.3 when the latter is intact, but is driven by a spring 128.5 when the weld 128.3 is broken so as to space the contacts 128.1 and 128.2 from one another. The relative moving apart of the contacts 128.1 and 128.2 under the effect of the arm 128.4 driven by the spring 128.5 advantageously takes place at least along the width axis Y110, in order in particular to optimize the amount of the internal volume V110 taken up by the arm 128.4. To this end, the varistor 123 is dimensioned and arranged in the internal volume V110 so as to form, laterally therewith and along the width axis Y110, a free space that is contained in the internal volume V110 and in which the arm 128.4 is arranged and able to be driven by the spring 128.5. Here, the varistor 123 thus has a parallelepipedal overall shape, the two smallest dimensions of which extend along the depth axis X110 and the length axis Z110, and a side face of which, arranged perpendicular to the width axis Y110, forms the input terminal of the varistor 123, fixedly carrying the contact 128.2, while at the same time being far enough, along the width axis Y110, from the side flank 113 of the housing 110 to form the abovementioned free space, as may be seen clearly in FIG. 4.

The gas spark gap 124 partially provides the abovementioned voltage-limiting function. Indeed, the gas spark gap 124 is designed to prevent the flow of current therethrough in the absence of an overvoltage, by isolating its input terminal and its output terminal by way of a gas contained in the gas spark gap 124, whereas when the voltage between its input and output terminals exceeds a predetermined threshold, an electric arc is formed in the abovementioned gas and allows current to flow through the gas spark gap 124. In practice, the specific electrical features intrinsic to the gas spark gap 124 are not limiting and stem from technologies that are known per se in the field. By way of non-limiting example, the gas spark gap comprises a ceramic tube that is closed at its two ends by metal cups acting as electrodes, in particular so as to withstand an 8/20 μS shock wave, while at the same time withstanding a current of 40 kA and limiting the overvoltage to 1.5 kV.

In any case, the gas spark gap 124 is connected in series to the varistor 123 in the internal volume V110, here by a conductive plate 129 that is arranged completely in the internal volume V110, connecting the output terminal of the varistor 123 and the input terminal of the gas spark gap 124 to one another.

In addition, the gas spark gap 124, which is advantageously arranged completely in the internal volume V110, is arranged, along the length axis Z110, between the phase terminal 121, the fuse 122 and the varistor 123, on the one hand, and the rest of the electrical module 120, on the other hand. Thus, along the length axis Z110, the varistor 123 is arranged between the fuse 122 and the gas spark gap 124. In other words, the phase terminal 121, the fuse 122, the varistor 123 and the gas spark gap 124 are stacked along the length axis Z110.

According to one preferred aspect, which is implemented here, the conductive plate 129 extends transverse to the depth axis X110 and is arranged in the internal volume V110 adjacent to the back 112 of the housing 110, in particular parallel to the back 112. In addition, the input terminal of the gas spark gap 124 is applied against this conductive plate 129 along the depth axis X110. This arrangement makes it possible to limit the amount of the internal volume V110 taken up by the gas spark gap 124.

The ground terminal 125 is designed to be connected to a protective conductor, such as the protective conductor 22 within the electrical installation 1. Thus, in the state in which the protection device 100 is mounted on the rail 15, the protective conductor 22 is connected to the electrical module 120 and, therefore, to the protection device 100 via the ground terminal 125. In the example in question in the figures, the ground terminal 125 is a screwed terminal, but, in line with considerations similar to those relating to the phase terminal 121, the specific features of the ground terminal 125 are not limiting.

In any case, as may be seen clearly in FIG. 4, the ground terminal 125 is arranged adjacent to the second end 116 of the housing 110 so that a protective conductor is able to be connected to the ground terminal 125 at this second end 116 of the housing 110. Thus, here, the ground terminal 125 is arranged essentially in the internal volume V110, by being arranged against the wall of the second end 116 of the housing 110, which is passed through by the branching passage 116.1, the ground terminal 125 being aligned with this branching passage 116.1: in this way, when one end of the protective conductor 22 extends through the branching passage 116.1, here along the length axis Z110, this end of the protective conductor is received in the ground terminal 125 for the purposes of the electrical connection between them, here by way of the clamping of a screw of the ground terminal 125.

The ground terminal 125 and the gas spark gap 124 are advantageously distributed along the length axis Z110 such that the gas spark gap 124 is arranged between the varistor 123 and the ground terminal 125. Thus, here, the phase terminal 121, the fuse 122, the varistor 123, the gas spark gap 124 and the ground terminal 125 are stacked along the length axis Z110. This stacking makes the electrical module 120 remarkably compact along the width axis Y110, thereby allowing the distance Δ110 indicated above to be dimensioned preferably.

In any case, the ground terminal 125 is connected in series to the gas spark gap 124 in the internal volume V110, here by a conductive braid 130 that is arranged completely in the internal volume V110, connecting the output terminal of the gas spark gap 124 and the ground terminal 125 to one another. The ground terminal 125 is thus connected in series to the varistor 123 via the gas spark gap 124.

The neutral terminal 126 is designed to be connected to a neutral conductor, such as the neutral conductor 17.1 within the electrical installation 1. Thus, in the state in which the protection device 100 is mounted on the rail 15, the neutral conductor 17.1 is connected to the electrical module 120 and, therefore, to the protection device 100 via the neutral terminal 126. In the example in question in the figures, the neutral terminal 126 is an automatic terminal, also called a pluggable terminal, here provided with a clip, but the specific features of the neutral terminal 126 are not limiting, as explained again below.

In any case, the neutral terminal 126 is arranged adjacent to the second end 116 of the housing 110 so that a neutral conductor is able to be connected to the neutral terminal 126 at this second end 116 of the housing 110. In view of the fact that the neutral terminal 126 is a pluggable terminal here, this neutral terminal 126 extends from the internal volume V110 to the outside of the housing 110, such that, when the protection device 100 is mounted on the rail 15, the neutral conductor 17.1 engages directly in the neutral terminal 126, more precisely in the part thereof, here the abovementioned clip, that extends to the outside of the housing 110, for the purposes of the automatic connection between this neutral conductor and the neutral terminal.

Along the length axis Z110, the neutral terminal 126 is advantageously arranged substantially level with the ground terminal 125. The amount of the internal volume V110 taken up by the neutral terminal 126 is thus optimized. In particular, the presence of the neutral terminal 126 does not impact the compactness of the electrical module 120 along the length axis Z110.

In any case, the neutral terminal 126 is connected to the ground terminal 125 via the gas spark gap 124 in the internal volume V110. For advantageous practical reasons, the neutral terminal 126 is preferably connected to the input terminal of the gas spark gap 124 by the conductive plate 129. The conductive plate 129 and the neutral terminal 126 are connected to one another here by a conductive braid 131 that is arranged completely in the internal volume V110.

Taking into account what has been disclosed up to now, it will be understood that the voltage-limiting function provided by the electrical module 120 is carried out by the varistor 123 and/or the gas spark gap 124 depending on the terminals of the electrical module 120 between which an overvoltage occurs. Thus, when an overvoltage is applied between the phase terminal 121 and the ground terminal 125, the voltage-limiting function is provided jointly by the varistor 123 and by the gas spark gap 124. When an overvoltage is applied between the phase terminal 121 and the neutral terminal 126, the voltage-limiting function is provided exclusively by the varistor 123. When an overvoltage is applied between the ground terminal 125 and the neutral terminal 126, the voltage-limiting function is provided exclusively by the gas spark gap 124.

Before continuing the detailed description of the protection device 100, a definition is given of a location E120 of the electrical module 120, which is advantageously arranged completely in the internal volume V110 and in which the gas spark gap 124 and the ground terminal 125 are arranged, but outside of which the phase terminal 121, the fuse 122 and the varistor 123 are arranged. The varistor 123 is thus arranged, along the length axis Z110, between the fuse 122 and this location E120, said location being adjacent to the second end 116 of the housing 110. The benefit of this location E120 will become apparent below in the description of the protection device 200.

Returning now to the description of the protection device 100, said protection device advantageously comprises an electronic supervision device 140 that makes it possible to monitor the operationality of the electrical module 120. The fact that the electrical module 120 might no longer be operational, in particular after a certain usage time, is related to the fact that, each time the electrical module 120 is called upon by virtue of an overvoltage being applied across its terminals, some of its components, in particular the fuse 122 and the varistor 123, are subject to damage, meaning that, as the corresponding damage progresses, the ability of the electrical module 120 to protect against future overvoltages decreases, this being tantamount to stating that the remaining service life of this protection device is reduced. Therefore, there is a tangible benefit in providing a user of the protection device 100 with an end-of-life indication for the electrical module 120, so that the user is able to be warned that it is necessary to carry out maintenance on or to replace the protection device 100 as soon as the electrical module 120 is considered to be no longer operational.

The electronic supervision device 140 comprises an assembled printed circuit 141 that is configured to provide an end-of-life indication for the electrical module 120. To this end, the assembled printed circuit 141 comprises a printed circuit board and electronic components that are carried by the printed circuit board and that are designed to process appropriate electrical signals coming from the electrical module 120, in order to deduce the end-of-life indication therefrom. In practice, the corresponding processing is known as such in the field and will therefore not be described below here. In the example illustrated in the figures, the assembled printed circuit 141 receives and thus processes electrical signals coming from the input terminal of the fuse 122, from the input terminal of the varistor 123 and from the output terminal of the varistor 123, respectively, in order to determine data representative of the operationality of the varistor 123, in particular the ageing thereof and/or the integrity of the weld 128.3, and the operationality of the fuse 122, in particular the integrity thereof. Here, the abovementioned electrical signals are transmitted by a conductive wire 142 that connects the assembled printed circuit 141 to the input terminal of the fuse 122, a conductive wire 143 that connects the assembled printed circuit 141 to the input terminal of the varistor 123, and by a conductive wire 144 that connects the assembled printed circuit 141 to the conductive plate 129 and, therefore, to the output terminal of the varistor 123.

The end-of-life indication, provided by the assembled printed circuit 141, is advantageously of luminous nature, that is to say in the form of a luminous signal emitted by one or more ad-hoc electronic components of the assembled printed circuit 141. This luminous signal is transmitted to the outside of the housing 110 for the attention of the user by a light guide 145 that extends from the assembled printed circuit 141 to the through-window 111.1 at the front 111 of the housing 110, as may be seen clearly in FIGS. 3, 5 and 6.

Regardless of the specific functional and structural features of the assembled printed circuit 141, it is advantageously arranged in the internal volume V110 such that this assembled printed circuit 141 is adjacent to one of the side flanks 113 and 114 of the housing 110, here to the side flank 114. The amount of the internal volume V110 taken up by the assembled printed circuit 141 and, more generally, by the electronic supervision device 140 is thus optimized.

In practice, the housing 110 is designed internally to support the electrical module 120 and the electronic supervision device 140 and to keep them in place. In other words, the housing 110 comprises, in its internal volume V110, electrically insulating arrangements that are dedicated to fixedly supporting the electrical module 120 and the electronic supervision device 140, in particular the phase terminal 121, the fuse 122, the varistor 123, the gas spark gap 124, the ground terminal 125, the neutral terminal 126 and the assembled printed circuit 141.

The protection device 200 will now be described in detail with reference to FIGS. 7 to 11.

Figure 7:
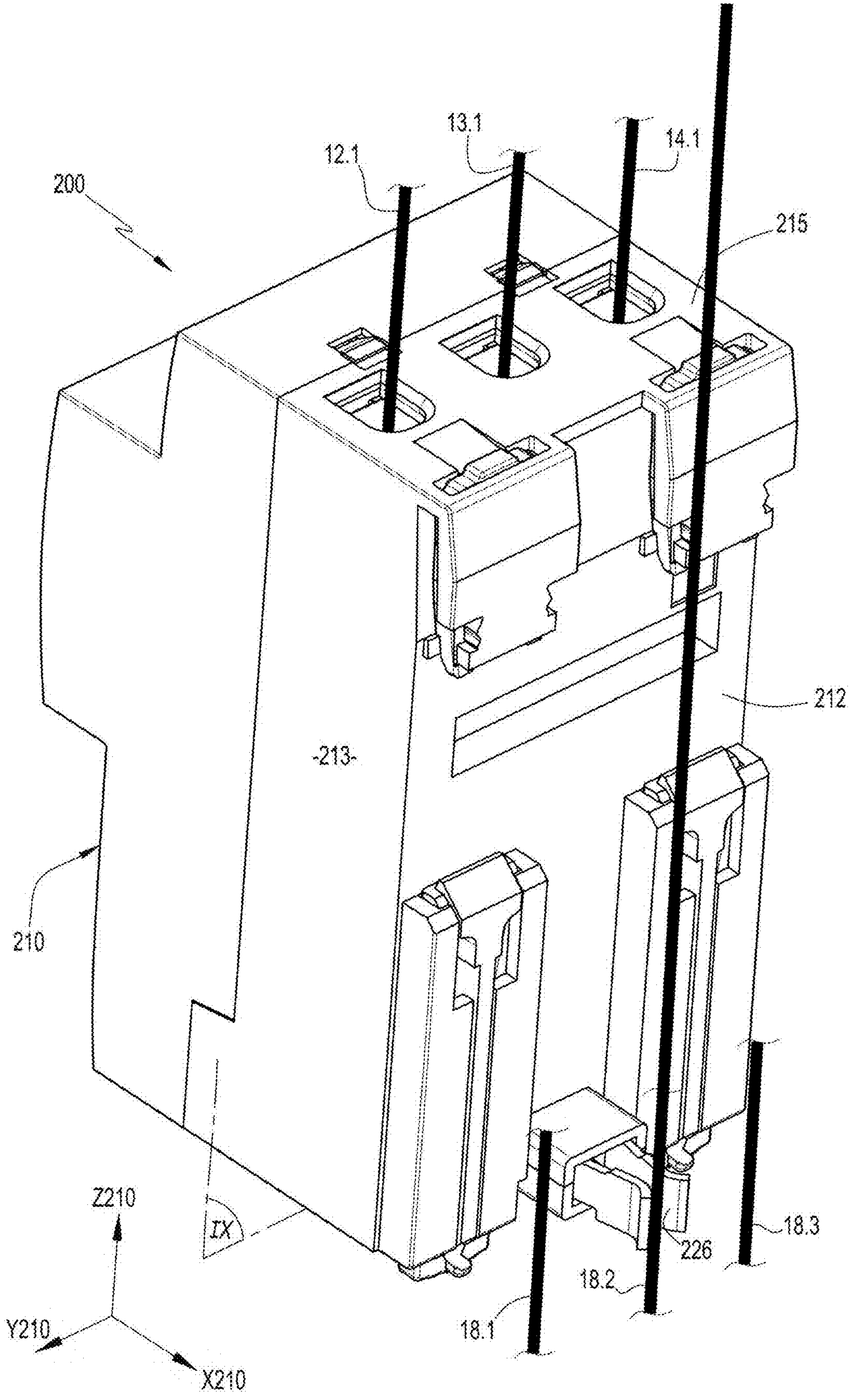
FIG. 7 is a perspective view of a protection device according to the invention, according to a three-phase embodiment.
Figure 8:
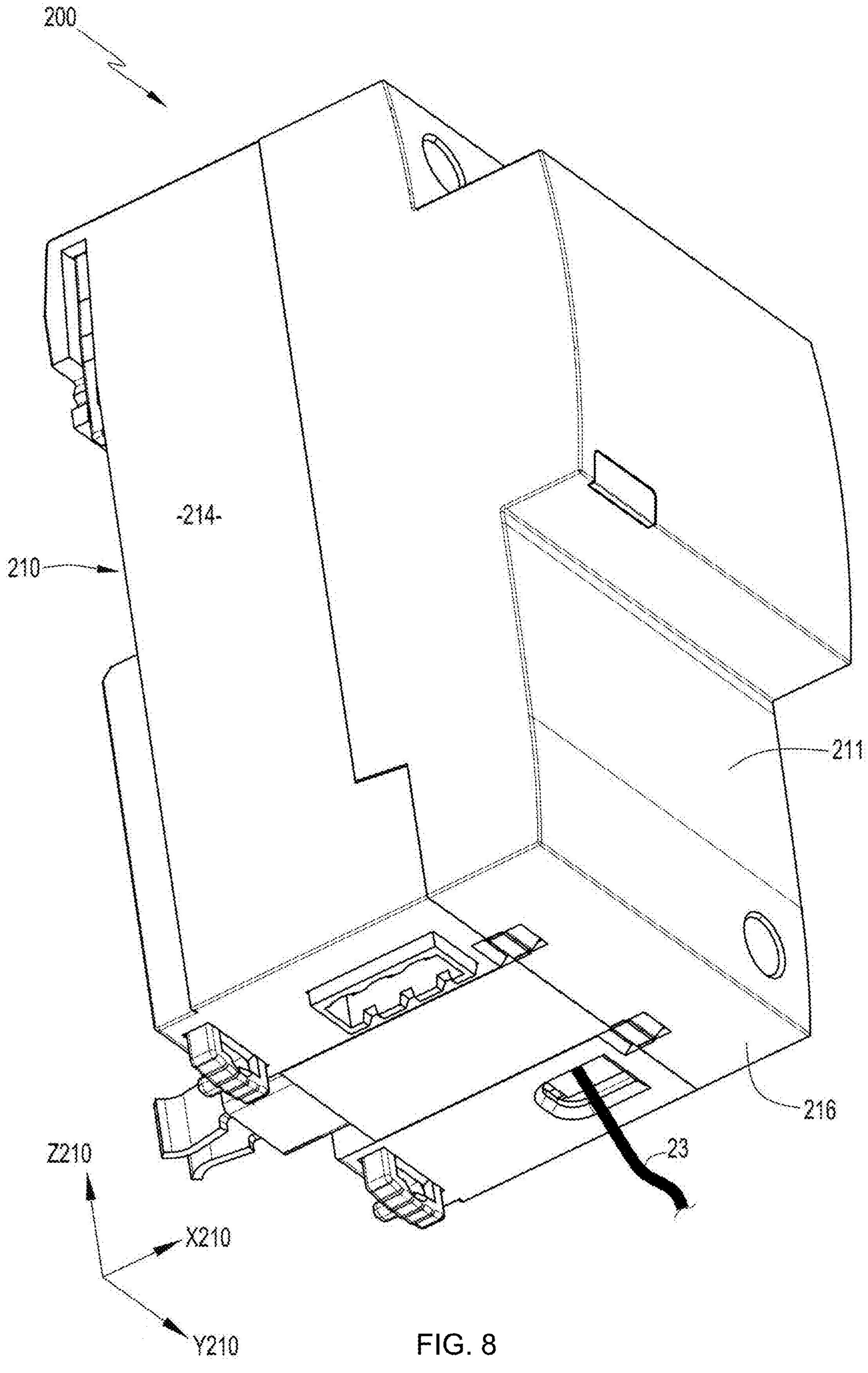
FIG. 8 is a view similar to FIG. 7, at a different observation angle.
Figure 9:
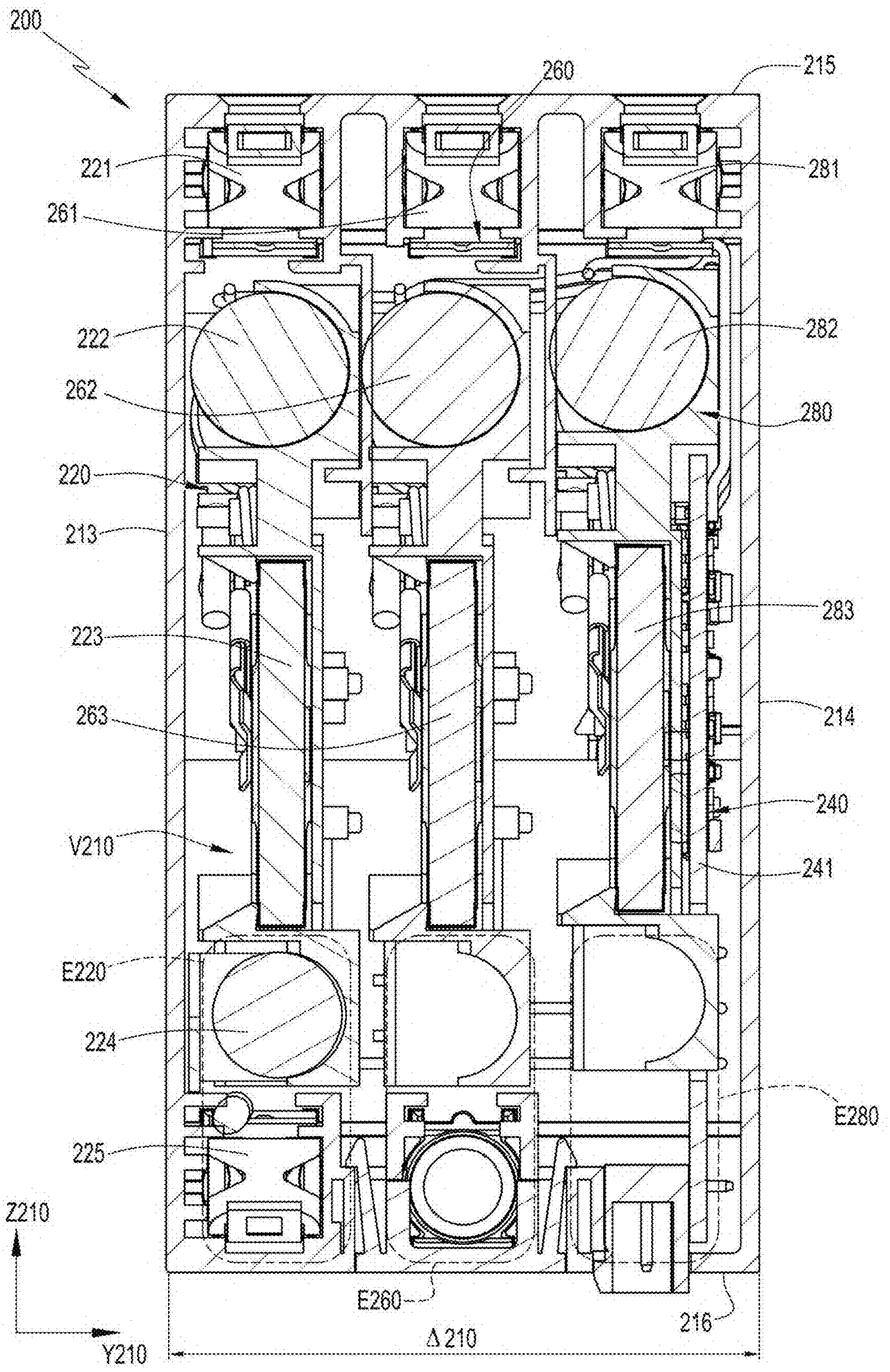
FIG. 9 is a section along the plane IX of FIG. 7.

As may be seen clearly in FIGS. 7 to 9, the protection device 200 comprises a housing 210 that defines a depth axis X210, a width axis Y210 and a length axis Z210, which are functionally similar to the depth axis X110, width axis Y110 and length axis Z110, respectively. In the state in which the protection device 200 is mounted on the rail 16 within the electrical installation 1, the width axis Y210 is parallel to the longitudinal direction of the phase busbars 12, 13 and 14, of the rail 16 and of the neutral busbar 18.

In addition, the housing 210 includes a front 211, a back 212, side flanks 213 and 214, first and second ends 215 and 216, which are functionally similar to the front 111, to the back 112, to the side flanks 113 and 114, and to the first and second ends 115 and 116 of the housing 110, respectively. In particular, the front 211, the back 212, the side flanks 213 and 214 and the first and second ends 215 and 216 together delimit an internal volume V210 of the housing 210, which is functionally similar to the internal volume V110.

The housing 210 differs from the housing 110 essentially in terms of its dimensioning along the width axis Y210. The distance Δ210, which, as illustrated in FIG. 9, separates the side flanks 213 and 214 from one another along the width axis Y210, is thus triple the distance Δ110, namely preferably 54 mm.

This dimensioning of the housing 210 is related to the fact that the protection device 200 does not comprise a single electrical module, as is the case for the electrical module 120 within the protection device 100, but three electrical modules 220, 260 and 280, which are distributed side-by-side along the width axis Y210.

Figure 10:
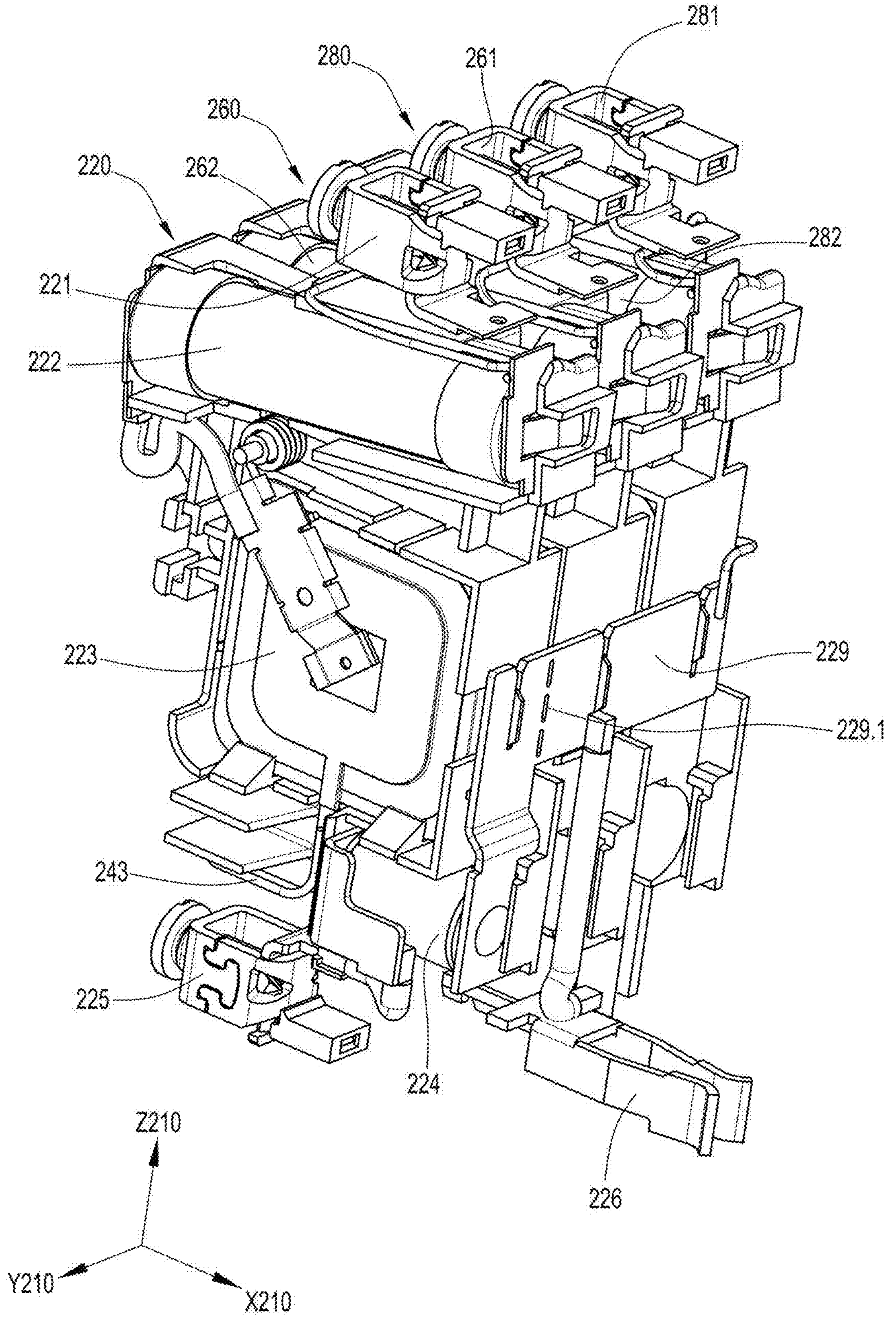
FIG. 10 is a perspective view of some internal components of the protection device of FIG. 7.
Figure 11:
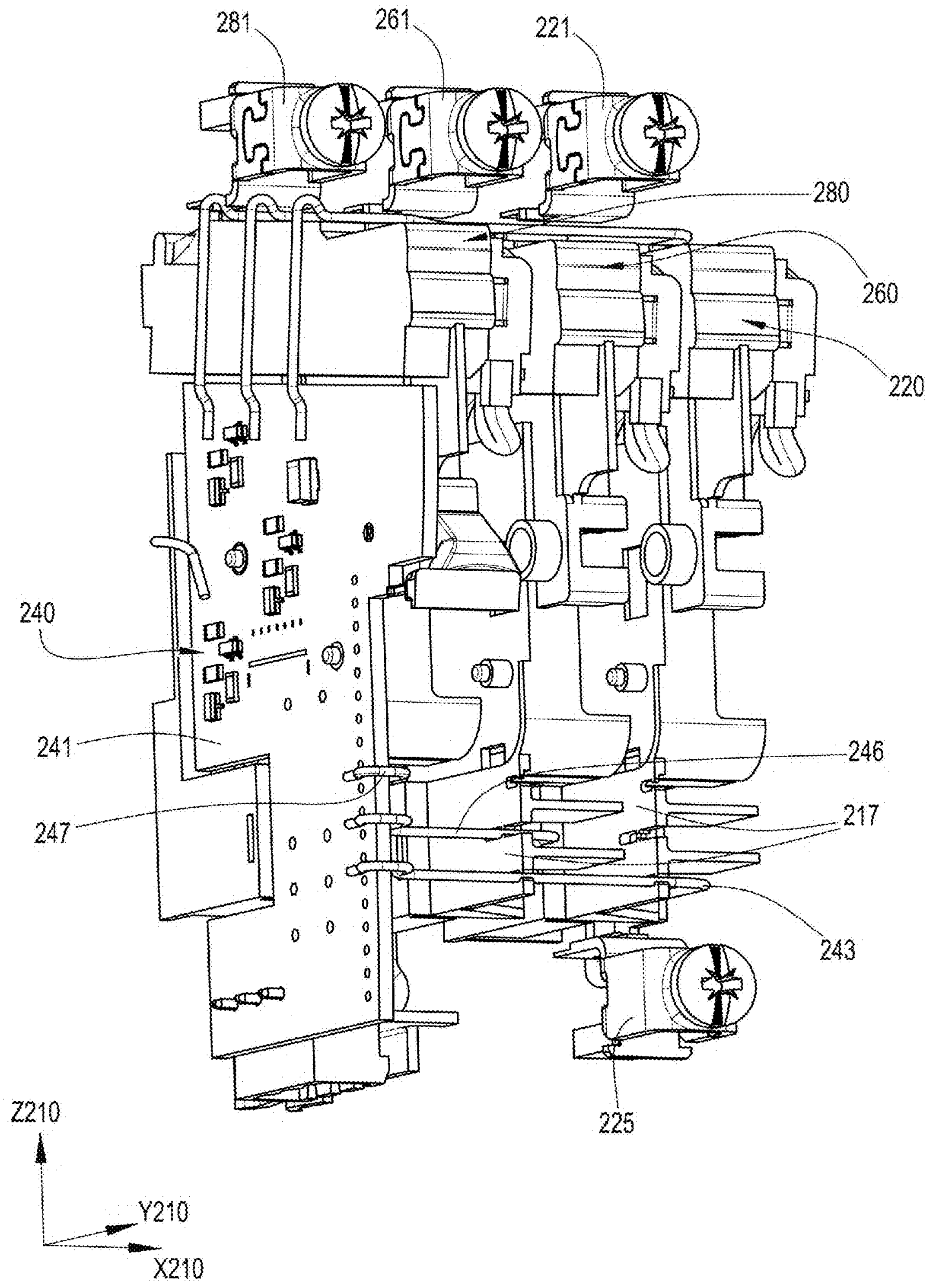
FIG. 11 is a view similar to FIG. 10, at a different observation angle.

As shown in FIGS. 9 to 11, each of the electrical modules 220, 260 and 280 comprises:

- a phase terminal 221, 261, 281, which is functionally or even structurally similar to the phase terminal 121 and which, in the state in which the protection device 200 is mounted on the rail 16, is connected to the phase conductor 12.1, 13.1, 14.1 at the first end 215 of the housing 210, as illustrated schematically in FIG. 7, these three phase terminals 221, 261 and 281 being distributed side-by-side along the width axis Y210;
- a fuse 222, 262, 282, which is functionally or even structurally similar to the fuse 122, in particular with regard to the phase terminal 221, 261, 281, these three fuses 222, 262 and 282 being distributed side-by-side along the width axis Y210; and

- a varistor 223, 263, 283, which is functionally or even structurally similar to the variator 123, in particular with regard to the corresponding fuse 222, 262, 282, these three varistors 223, 263 and 283 being distributed side-by-side along the width axis Y210.

As indicated schematically in FIG. 9, each of the electrical modules 220, 260 and 280 also comprises a location E220, E260, E280 that, similarly to the location E120, is arranged in the internal volume V210 such that the location E220, E260, E280 is adjacent to the second end 216 of the housing 210 and the corresponding varistor 223, 263, 283 is arranged, along the length axis Z210, between the corresponding fuse 222, 262, 282 and the location E220, E260, E280. The three locations E220, E260 and E280 are distributed side-by-side along the width axis Y210.

The electrical modules 220, 260 and 280 differ from the electrical module 120 in that just one of the three electrical modules 220, 260 and 280, here the electrical module 220, comprises a gas spark gap 224 and a ground terminal 225.

The gas spark gap 224 and the ground terminal 225 are functionally or even structurally similar to the gas spark gap 124 and to the ground terminal 125, respectively. In particular, the gas spark gap 224 and the ground terminal 225 are connected in series to the varistors 223, 263 and 283 in the internal volume 210. In addition, in the state in which the protection device 200 is mounted on the rail 16, the protective conductor 23 is connected to the ground terminal 225 at the second end 216 of the housing 210, as indicated schematically in FIG. 8.

The gas spark gap 224 and the ground terminal 225 are arranged in the location E220 of the electrical module 220, without occupying the locations E260 and E280 of the other two electrical modules 260 and 280. This thus gives an understanding of the benefit of the modular structure of the protection devices 100 and 200, linked to their electrical modules 120, 220, 260 and 280, in the sense that the phase terminal 121, the fuse 122, the varistor 123 and the location 120, before said location is potentially occupied by the gas spark gap 124 and the ground terminal 225, together form a subassembly of the electrical module 120 that is functionally or even structurally identical in each of the electrical modules 220, 260 and 280. Of course, within the protection device 200, just one of the three subassemblies that are present has its location occupied by the gas spark gap 224 and the ground terminal 225. This modular structure allows industrialization to be made easier and economical, and allows the protection devices 100 and 200 to be maintained or replaced.

Also for practical and economic reasons, the three varistors 223, 263 and 283 of the protection device 200 are preferably connected to the gas spark gap 224 by a conductive plate 229, which is functionally similar to the conductive plate 129 and which is advantageously common to the three electrical modules 120, 260 and 280, as may be seen in FIG. 10. According to one particularly expedient optional aspect, the conductive plate 229 is designed to be breakable, here along a cutting line 229.1 visible in FIG. 10, so as to be used either in the protection device 200 when the conductive plate 229 is kept whole or in the protective device 100 when the conductive plate 229 is severed so as to retain only a fragment thereof that corresponds to the conductive plate 129.

Moreover, one of the electrical modules 220, 260 and 280, here the electrical module 260, advantageously comprises a neutral terminal 266 that is functionally or even structurally similar to the neutral terminal 126. In particular, the neutral terminal 266 is adjacent to the second end 216 of the housing 210 such that, in the state in which the protection device 200 is mounted on the rail 16, the neutral conductor 18.2 is connected to the neutral terminal 266 at this second end 216, as illustrated schematically in FIG. 7. In addition, the neutral terminal 266 is connected to the ground terminal 225 via the gas spark gap 224 in the internal volume V220. Here, the neutral terminal 266 is advantageously connected to the gas spark gap 224 by the conductive plate 229.

The protection device 200 also comprises an electronic supervision device 240 that is functionally similar to the electronic supervision device 140. In particular, the electronic supervision device 240 comprises an assembled printed circuit 241 that is functionally similar to the assembled printed circuit 141, thus making it possible to monitor the operationality of the three electrical modules 220, 260 and 280 together.

In line with considerations similar to those explained above for the assembled printed circuit 141, the assembled printed circuit 241 is advantageously connected to the respective input terminals of the three varistors 223, 263 and 283 by respective conductive wires 243, 246 and 247 of the electronic supervision device 240. These conductive wires 243, 246 and 247 are preferably positioned and kept spaced from one another in the internal volume V210 by dedicated internal partitions 217 of the housing 210, as may be seen clearly in FIG. 11. The performance of the electronic supervision device 240 is thus preserved in spite of the compactness of the protection device 200.

Figure 12:
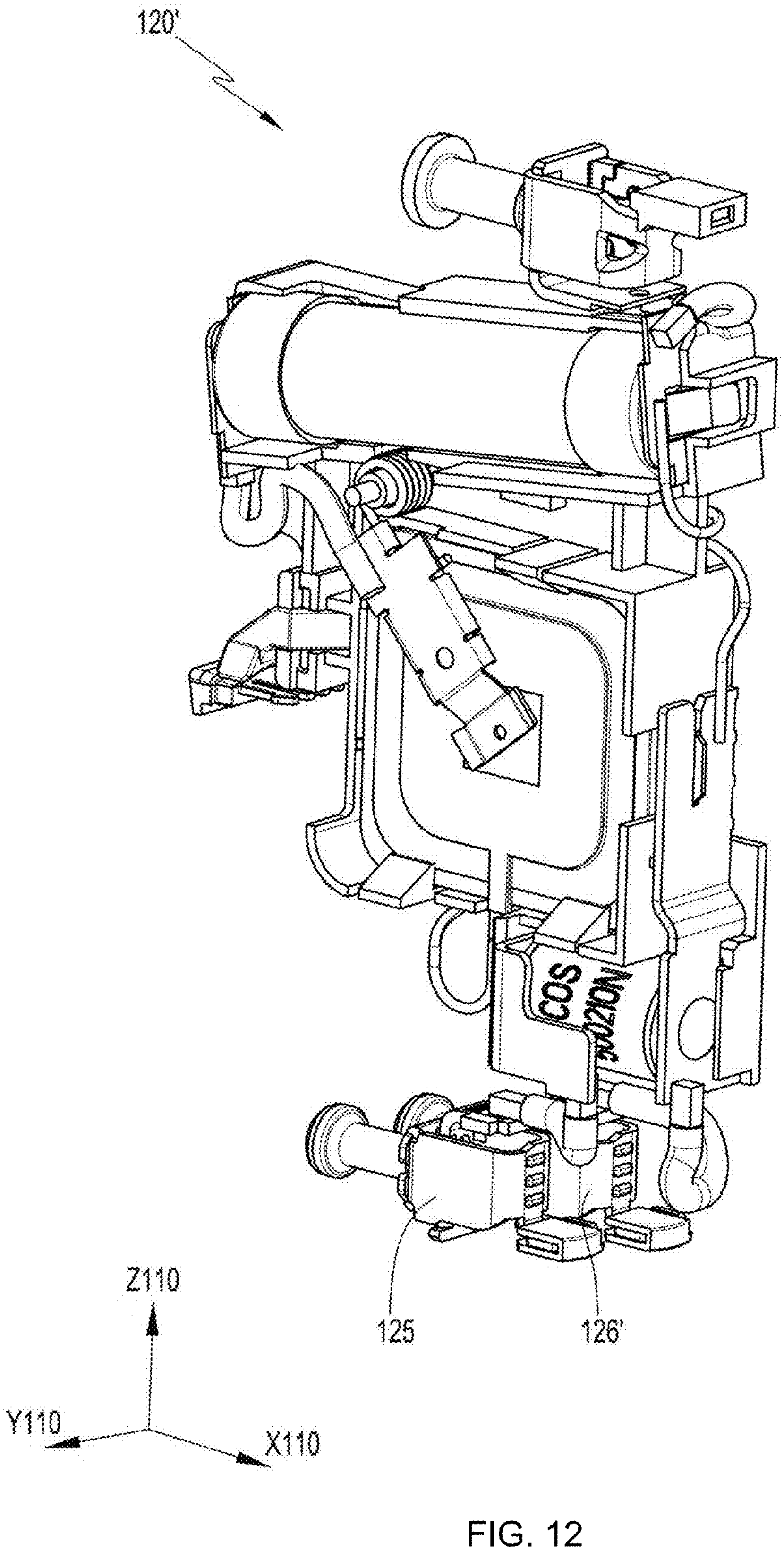
FIG. 12 is a view similar to that of FIG. 5, but illustrating a variant of the single-phase embodiment of the protection device according to the invention.
Figure 13:
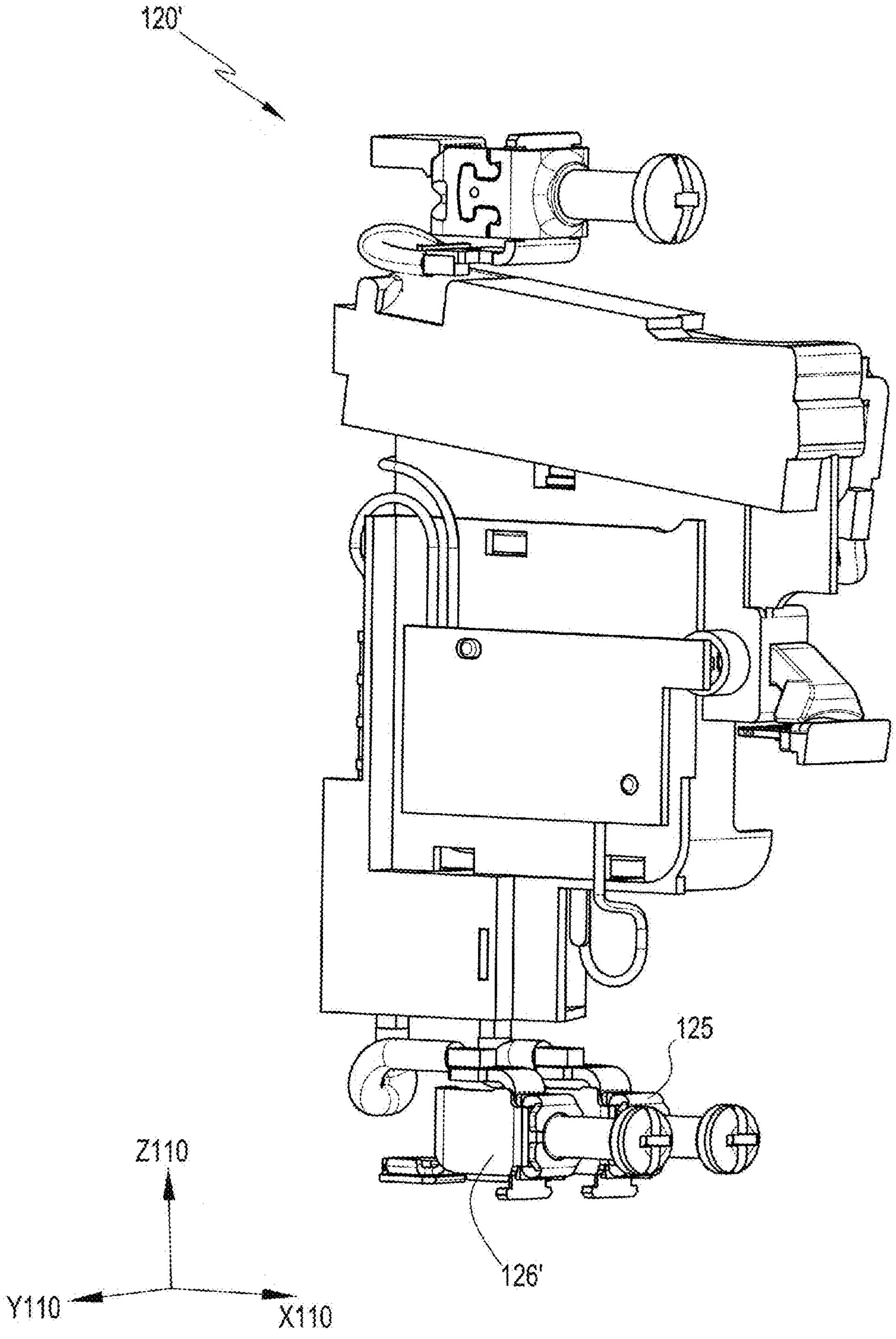
FIG. 13 is a view similar to FIG. 12, at a different observation angle.

FIGS. 12 and 13 show one variant of the protection device 100, which differs from the implementation form of the protection device 100 shown in FIGS. 2 to 6 by way of its neutral terminal, referenced 126', belonging to its electrical module, referenced 120'. Indeed, in the variant in FIGS. 12 and 13, the neutral terminal 126' is not a pluggable terminal, like the neutral terminal 126, but a screwed terminal, such as the one outlined above for the phase terminal 121 and ground terminal 125 illustrated in FIGS. 2 to 6.

The variant in FIGS. 12 and 13 thus illustrates the multiplicity of implementation forms that the phase terminal and/or neutral terminal of the protection device 100 may adopt. Of course, identical considerations apply to the protection device 200.

In practice, depending on the implementation form of the phase and neutral terminals, the implementation form of the phase and neutral conductors to which these terminals are connected in the mounted state of the protection devices 100 and 200 is obviously adapted accordingly. Thus, for the variant of the protection device 100 illustrated in FIGS. 12 and 13, the neutral conductor to which the neutral terminal 126' is able to be connected may be wired, intended to connect the neutral terminal 126' to a neutral block terminal, located inside the electrical switchboard 10 at a distance from the group of phase busbars 12, 13 and 14; in this case, it will be understood that the electrical switchboard 10 might then not have any neutral busbars 17 and 18, for the benefit of the abovementioned neutral block terminal.

Lastly, various arrangements and variants of the protection devices 100 and 200 and of the electrical installation 1 that have been described up to now are also conceivable. By way of example:

- if the protection device comprises a plurality of electrical modules, such as the three electrical modules 220, 260 and 280 of the protection device 200, the number of electrical modules of this plurality may be other than three, the value of this number, where applicable, being equal to the number of phases of the current supplied to the electrical installation; and/or both for single-phase protection devices, such as the protection device 100, and for multi-phase protection devices, such as the three-phase protection device 200, the protection device might not have any neutral terminals, such as the neutral terminals 126, 126' and 266; in this case, only the ground terminal 125 or 225 is still present at the second end 116 or 216 of the corresponding housing 110 or 210; such a simplification of the protection device is conceivable in particular when the neutral of the electrical installation is locally grounded, that is to say grounded in the building, specifically by dedicated means that are separate from the protection device and that directly connect ground and the neutral.

The invention claimed is:

1. A protection device against overvoltages, comprising:

a housing, which defines a depth axis, a width axis and a length axis that are perpendicular to one another, and which includes:

a front and a back, which are opposite one another along the depth axis, the back being designed to cooperate with a rail of an electrical switchboard so that the housing is supported by the rail, two side flanks, which are opposite one another along the width axis and which are connected to one another along the width axis by the front and the back of the housing, and first and second ends, which are opposite one another along the length axis and which are connected to one another along the length axis by the front, the back and the two side flanks of the housing, and an electrical module or a plurality of electrical modules, arranged in an internal volume of the housing, delimited jointly by the front, the back, the two side flanks and the first and second ends of the housing, wherein the electrical module or each of the plurality of electrical modules comprises:

a phase terminal, which is adjacent to the first end of the housing such that a phase conductor of the electrical switchboard is able to be connected to the phase terminal at the first end of the housing, a location, which is adjacent to the second end of the housing, and a fuse and a varistor, which are connected in series to the phase terminal in the internal volume of the housing and which, along the length axis, are distributed such that the fuse is arranged between the phase terminal and the varistor and that the varistor is arranged between the fuse and the location, and wherein the electrical module or at least one of the plurality of electrical modules further comprises a gas spark gap and a ground terminal, which are:

connected in series to the varistor of the electrical module or to the respective varistors of the plurality of electrical modules in the internal volume of the housing, and arranged in the location of the electrical module such that a protective conductor of the electrical switchboard is able to be connected to the ground terminal at the second end of the housing.

2. The protection device according to claim 1, wherein the electrical module or at least one of the plurality of electrical modules further comprises a neutral terminal that is:

connected to the ground terminal via the gas spark gap in the internal volume of the housing, and adjacent to the second end of the housing such that a neutral conductor of the electrical switchboard is able to be connected to the neutral terminal at the second end of the housing.

3. The protection device according to claim 1, wherein the gas spark gap is connected to the varistor of the electrical module or to the respective varistors of the plurality of electrical modules by a conductive plate:

that is arranged in the internal volume of the housing, while being adjacent to the back of the housing, and against which a terminal of the gas spark gap is applied along the depth axis.

4. The protection device according to claim 2, wherein the gas spark gap is connected to the varistor of the electrical module or to the respective varistors of the plurality of electrical modules by a conductive plate:

that is arranged in the internal volume of the housing, while being adjacent to the back of the housing, and against which a terminal of the gas spark gap is applied along the depth axis, and wherein the neutral terminal is connected to the gas spark gap by the conductive plate.

5. The protection device according to claim 1, wherein provision is made for a single electrical module, the protection device being single-phase, and wherein the two side flanks of the housing are planar and parallel and spaced from one another by 18 mm along the width axis.

6. The protection device according to claim 1, wherein provision is made for three electrical modules, the protection device being three-phase, and wherein the two side flanks of the housing are planar and parallel and spaced from one another by 54 mm along the width axis.

7. The protection device according to claim 1, wherein, for the electrical module or each of the plurality of electrical modules, the fuse has an elongate shape that extends lengthwise from substantially the front to substantially the back of the housing.

8. The protection device according to claim 1, wherein, for the electrical module or else each of the plurality of electrical modules, the fuse and the varistor are connected to one another by an electrical link including two contacts and a weld that joins the two contacts when the weld is intact while at the same time being designed to break under the effect of heating of the varistor, and wherein one of the two contacts is carried by an arm, which is held fixed in position by the weld when the weld is intact, and which is driven by a spring in the internal volume of the housing when the weld is broken so as to space the two contacts from one another at least along the width axis.

9. The protection device according to claim 1, wherein the protection device furthermore comprises an electronic supervision device that:

includes an assembled printed circuit that is configured to provide an end-of-life indication for the electrical module or for the plurality of electrical modules, and is arranged in the internal volume of the housing such that the assembled printed circuit is adjacent to one of the two side flanks of the housing.

10. The protection device according to claim 9, wherein the electronic supervision device is connected to the respective varistors of the plurality of electrical modules by respective conductive wires, and wherein the housing includes internal partitions that position the conductive wires in the internal volume of the housing and keep them spaced from one another.

11. An electrical installation comprising:

an electrical switchboard that comprises:

phase busbars, which are intended to be supplied with power respectively by a phase of a voltage of an electric power supply and which extend lengthwise parallel to one another, while being arranged side-by-side so as to form a group in an intermediate zone of the electrical switchboard, two rails, which are each designed to support items of electrical equipment and which each extend lengthwise parallel to the phase busbars, the two rails being arranged along and on either side of the group, and a ground strip that is intended to be connected to ground, and the protection device according to claim 1, wherein the housing is mounted on one of the two rails such that the first end of the housing faces the group of phase busbars along the length axis, wherein the phase terminal of the electrical module or of each of the plurality of electrical modules is connected to one of the phase busbars by a phase conductor, which extends from and transverse to the phase busbar and which is connected to the phase terminal of the electrical module at the first end of the housing, and wherein the ground terminal is connected to the ground strip by a protective conductor, which is in wired form and one end of which is connected to the ground terminal at the second end of the housing.

12. The electrical installation according to claim 11, wherein, in the protection device, the electrical module or at least one of the plurality of electrical modules further comprises a neutral terminal that is:

connected to the ground terminal via the gas spark gap in the internal volume of the housing, and adjacent to the second end of the housing such that a neutral conductor of the electrical switchboard is able to be connected to the neutral terminal at the second end of the housing, and wherein a neutral conductor is connected to the neutral terminal at the second end of the housing.

13. The electrical installation according to claim 12, wherein the electrical switchboard furthermore comprises, for at least one of the two rails, a neutral busbar that is intended to be supplied with power by a neutral of the electric power supply and that extends lengthwise parallel to and at a distance from the phase busbars, said at least one of the two rails being interposed between the neutral busbar and the group of phase busbars, and wherein the neutral terminal is connected to the neutral busbar by the neutral conductor that extends from and transverse to the neutral busbar.

* * * * *